(12) United States Patent
Kaushik

(10) Patent No.: US 8,037,262 B2
(45) Date of Patent: Oct. 11, 2011

(54) HIERARCHY OF A STRUCTURE OF A VOLUME

(75) Inventor: Shyam Kaushik, Karnataka (IN)

(73) Assignee: LSI Corporation, Milpitas, CA (US)

( * ) Notice: Subject to any disclaimer, the term of this patent is extended or adjusted under 35 U.S.C. 154(b) by 788 days.

(21) Appl. No.: 11/654,272

(22) Filed: Jan. 16, 2007

(65) Prior Publication Data
US 2008/0172542 A1 Jul. 17, 2008

(51) Int. Cl.
*G06F 13/00* (2006.01)
(52) U.S. Cl. ........................................ 711/161; 711/162
(58) Field of Classification Search .................. 711/161, 711/162
See application file for complete search history.

(56) References Cited

U.S. PATENT DOCUMENTS

| | | | | |
|---|---|---|---|---|
| 7,111,136 | B2 * | 9/2006 | Yamagami | 711/162 |
| 7,197,502 | B2 * | 3/2007 | Feinsmith | 707/100 |
| 7,694,090 | B2 * | 4/2010 | Hosouchi et al. | 711/162 |
| 2007/0016754 | A1 * | 1/2007 | Testardi | 711/206 |

* cited by examiner

*Primary Examiner* — Hetul Patel
(74) *Attorney, Agent, or Firm* — Raj Abhyanker, P.C.

(57) ABSTRACT

A method, apparatus and system of a hierarchy of a structure of a volume is disclosed. In one embodiment, a system includes a physical volume, a structure to provide a mapping to a location of a data segment of the physical volume that may include a table having a hierarchy, a logical volume management module to define a logical volume as an arrangement of the physical volume, a snapshot module that may automatically generate a point-in-time image of the logical volume, may prompt the logical volume management module to create and insert a first table and a second table into the hierarchy of the structure, the first table may provide a set of updates to the logical volume, the second table may provide a set of updates to the point-in-time image, and a data processing system to perform a write IO (Input/Output) operation and a read IO operation.

28 Claims, 16 Drawing Sheets

| | | 412 | | |
|---|---|---|---|---|
| 402 | 404 | 406 | 408 | 410 |
| 1 | 0 | 0x400000 | 1 | 0xFF |
| 2 | 1 | 0x400000 | 1 | 0x1FF |
| 2 | 2 | FREE | | |

| PHYSICAL VOLUME 104 | LOGICAL VOLUME MANAGEMENT MODULE 110 | DATA PROCESSING SYSTEM 122 |
|---|---|---|
| STORE DATA IN A SPACE OF A STORAGE DEVICE 604 | PROVIDE A LOGICAL VOLUME AND A NUMBER OF POINT-IN-TIME IMAGES OF THE LOGICAL VOLUME, AND A STRUCTURE HAVING A HIERARCHY OF MAPPING TABLES 602 | |
| | | READ IO REQUEST FROM AN APPLICATION 606 |
| | LOOK UP THE LOGICAL ADDRESS IN EACH MAPPING TABLE ASSOCIATED WITH THE LOGICAL VOLUME ACCORDING TO DESCENDING RANK STARTING WITH THE HIGHEST RANKED MAPPING TABLE 608 | |
| | FIND A ENTRY FOR THE LOGICAL ADDRESS 610 | |
| | EXTRACT LOCATION AND ADDRESS INFORMATION OF A PHYSICAL ADDRESS FROM THE ENTRY 612 | |
| RETURN A DATA STORED IN THE PHYSICAL ADDRESS 616 | USE INPUT/OUTPUT CHANNEL TO RETRIEVE DATA IN A PHYSICAL ADDRESS 614 | |
| | | PROCESS THE DATA 618 |
| | | READ IO REQUEST FROM AN APPLICATION 620 |
| | LOOK UP THE LOGICAL ADDRESS IN EACH MAPPING TABLE ASSOCIATED WITH THE LOGICAL VOLUME ACCORDING TO DESCENDING RANK STARTING WITH THE HIGHEST RANKED MAPPING TABLE 622 | |
| | FIND AN UNMAPPED, UNUSED ENTRY FOR THE LOGICAL ADDRESS IN EACH ASSOCIATED MAPPING TABLE 624 | |
| RETURN A ZERO-FILLED BUFFER 626 | | |

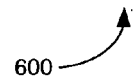

| PHYSICAL VOLUME 104 | LOGICAL VOLUME MANAGEMENT MODULE 110 | DATA PROCESSING SYSTEM 122 |
|---|---|---|
| STORE DATA IN A SPACE OF A STORAGE DEVICE 706 | DEFINE A LOGICAL VOLUME, A COMMON MAPPING TABLE AND A STRUCTURE HAVING A HIERARCHY AND ASSIGN THE COMMON MAPPING TABLE A RANK IN THE HIERARCHY 704 | ALLOCATE SPACE FOR A LOGICAL VOLUME ON A STORAGE DEVICE 702 |
| | A SNAPSHOT MODULE INSTANTIATES A POINT-IN-TIME IMAGE OF THE LOGICAL VOLUME 710 | PARTITION SPACE FOR A POINT-IN-TIME IMAGE ON A STORAGE DEVICE 708 |
| | CREATE A FIRST TABLE ASSOCIATED WITH THE LOGICAL VOLUME, CREATE A SECOND TABLE ASSOCIATED WITH THE POINT-IN-TIME IMAGE AND ASSOCIATE THE COMMON MAPPING TABLE WITH THE LOGICAL VOLUME AND THE POINT-IN-TIME IMAGE 712 | |
| | INCORPORATE THE FIRST MAPPING TABLE OF THE LOGICAL VOLUME INTO THE HIERARCHY OF THE STRUCTURE AND ASSIGN A RANK HIGHER THAN THE COMMON MAPPING TABLE 714 | |
| | INCORPORATE THE SECOND MAPPING TABLE OF THE LOGICAL VOLUME INTO THE HIERARCHY OF THE STRUCTURE AND ASSIGN A RANK HIGHER THAN THE COMMON MAPPING TABLE 716 | |
| | | WRITE IO OPERATION TO A FIRST LOGICAL ADDRESS OF THE LOGICAL VOLUME 718 |
| | LOOKUP THE LOGICAL ADDRESS IN THE FIRST TABLE AND FIND AN UNMAPPED LOGICAL ADDRESS 720 | |
| ALLOCATE A FREE DATA BLOCK AND WRITE THE DATA TO THE FREE DATA BLOCK 722 | CREATE A NEW ENTRY OF THE FIRST TABLE HAVING THE LOGICAL ADDRESS, THE PHYSICAL ADDRESS AND A LOCATION INFORMATION OF THE PHYSICAL VOLUME 724 | |
| STORE THE FIRST MAPPING TABLE HAVING THE UPDATED ENTRY IN THE STRUCTURE OF THE PHYSICAL VOLUME 726 | | |
| | | WRITE IO OPERATION TO AN ADDRESS OF THE POINT-IN-TIME IMAGE 728 |
| | LOOKUP THE ADDRESS IN THE SECOND TABLE AND FIND AN UNMAPPED ADDRESS 730 | |

FIGURE 7A

| ALLOCATE A FREE DATA BLOCK, WRITE THE DATA TO THE FREE DATA BLOCK, AND RETURN THE PHYSICAL ADDRESS 734 | CREATE A NEW ENTRY IN THE SECOND TABLE HAVING THE ADDRESS, PHYSICAL ADDRESS, AND A LOCATION INFORMATION OF THE PHYSICAL VOLUME 732 | |
|---|---|---|
| STORE THE SECOND MAPPING TABLE HAVING THE NEW ENTRY IN THE STRUCTURE OF THE PHYSICAL VOLUME 736 | | |
| | | WRITE IO OPERATION TO THE FIRST LOGICAL ADDRESS OF THE LOGICAL VOLUME 738 |
| | LOOKUP THE LOGICAL ADDRESS IN THE FIRST TABLE 740 | |
| | FIND AN ENTRY IN THE TABLE FOR THE LOGICAL VOLUME ADDRESS 742 | |
| OVERWRITE THE DATA IN THE PHYSICAL ADDRESS 748 | EXTRACT LOCATION AND ADDRESS INFORMATION OF A PHYSICAL ADDRESS FROM THE ENTRY 744 | |
| STORE THE SECOND MAPPING TABLE HAVING THE MODIFIED ENTRY IN THE STRUCTURE OF THE PHYSICAL VOLUME 750 | UPDATE THE ENTRY FOR THE DATA 746 | |

| PHYSICAL VOLUME 104 | LOGICAL VOLUME MANAGEMENT MODULE 110 | DATA PROCESSING SYSTEM 122 |
|---|---|---|
| ALLOCATE SPACE FOR A LOGICAL VOLUME 804 | DEFINE A LOGICAL VOLUME, A COMMON MAPPING TABLE, AND A STRUCTURE HAVING A HIERARCHY, AND ASSIGN THE COMMON MAPPING TABLE A RANK IN THE HIERARCHY 802 | |
| | | MOUNT FILE SYSTEM ON LOGICAL VOLUME 806 |
| PARTITION SPACE FOR A POINT-IN-TIME IMAGE 808 | A SNAPSHOT MODULE INSTANTIATES A POINT-IN-TIME IMAGE OF THE LOGICAL VOLUME 810 | |
| | CREATE A FIRST MAPPING TABLE AND A SECOND MAPPING TABLE 812 | |
| | ASSOCIATE THE FIRST MAPPING TABLE WITH THE LOGICAL VOLUME, ASSOCIATE THE SECOND MAPPING TABLE WITH THE POINT-IN-TIME IMAGE, AND ASSOCIATE THE COMMON MAPPING TABLE WITH THE LOGICAL VOLUME AND THE POINT-IN-TIME IMAGE 814 | |
| | INCORPORATE THE FIRST MAPPING TABLE OF THE LOGICAL VOLUME INTO THE HIERARCHY OF THE STRUCTURE AND ASSIGN A RANK HIGHER THAN THE COMMON MAPPING TABLE 816 | |
| | INCORPORATE THE SECOND MAPPING TABLE OF THE POINT-IN-TIME IMAGE INTO THE HIERARCHY OF THE STRUCTURE AND ASSIGN A RANK HIGHER THAN THE COMMON MAPPING TABLE 818 | |
| | | UNMOUNT FILE SYSTEM 820 |
| | | MOUNT FILE SYSTEM ON POINT-IN-TIME IMAGE TO CREATE A SNAPSHOT VOLUME 822 |
| ALLOCATE SPACE AND STORE DATA OF A WRITE IO OPERATION TO A FREE DATA BLOCK OF THE POINT-IN-TIME IMAGE 824 | UPDATE THE SECOND MAPPING TABLE OF THE POINT-IN-TIME IMAGE 826 | PERFORM A NUMBER ON WRITE IO AND/OR READ IO OPERATIONS ON THE SNAPSHOT VOLUME TO CREATE A MODIFIED FILE SYSTEM 828 |
| | | TEST THE MODIFIED FILE SYSTEM 830 |
| | | UNMOUNT FILE SYSTEM 832 |

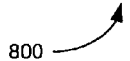

| PHYSICAL VOLUME 104 | LOGICAL VOLUME MANAGEMENT MODULE 110 | DATA PROCESSING SYSTEM 122 |
|---|---|---|
| ALLOCATE SPACE FOR A LOGICAL VOLUME 904 | DEFINE A LOGICAL VOLUME, A COMMON MAPPING TABLE, AND A STRUCTURE HAVING A HIERARCHY, AND ASSIGN THE COMMON MAPPING TABLE A RANK IN THE HIERARCHY 902 | |
| PARTITION SPACE FOR A FIRST POINT-IN-TIME IMAGE 906 | A SNAPSHOT MODULE INSTANTIATES A POINT-IN-TIME IMAGE OF THE LOGICAL VOLUME AND THE COMMON MAPPING TABLE 908 | |
| | CREATE A FIRST TABLE ASSOCIATED WITH THE LOGICAL VOLUME, A SECOND TABLE ASSOCIATED WITH THE FIRST POINT-IN-TIME IMAGE, AND ASSOCIATE THE COMMON MAPPING TABLE WITH THE LOGICAL VOLUME AND THE FIRST POINT-IN-TIME IMAGE 910 | |
| | INCORPORATE THE FIRST MAPPING TABLE OF THE LOGICAL VOLUME INTO THE HIERARCHY OF THE STRUCTURE AND ASSIGN A RANK HIGHER THAN THE COMMON MAPPING TABLE 912 | |
| | INCORPORATE THE SECOND MAPPING TABLE OF THE FIRST POINT-IN-TIME IMAGE INTO THE HIERARCHY OF THE STRUCTURE AND ASSIGN A RANK HIGHER THAN THE COMMON MAPPING TABLE 914 | |
| | | PERFORM A NUMBER OF WRITE IO AND READ IO OPERATIONS ON THE LOGICAL VOLUME AND THE FIRST POINT-IN-TIME IMAGE 916 |
| ALLOCATE SPACE AND STORE DATA OF A WRITE IO OPERATION TO A FREE DATA BLOCK OF THE POINT-IN-TIME IMAGE OR A FREE DATA BLOCK OF THE LOGICAL VOLUME 918 | UPDATE THE FIRST MAPPING TABLE AND THE SECOND MAPPING TABLE 920 | |
| PARTITION SPACE FOR A SECOND POINT-IN-TIME IMAGE 926 | A SNAPSHOT MODULE INSTANTIATES A SECOND POINT-IN-TIME IMAGE OF THE LOGICAL VOLUME 924 | BACKUP THE LOGICAL VOLUME 922 |
| | CREATE A THIRD TABLE ASSOCIATED WITH THE LOGICAL VOLUME AND CREATE A FOURTH TABLE ASSOCIATED WITH THE SECOND POINT-IN-TIME IMAGE 928 | |

FIGURE 9A

| | | |
|---|---|---|
| | ASSOCIATE THE FIRST MAPPING TABLE WITH THE LOGICAL VOLUME AND THE SECOND POINT-IN-TIME IMAGE SUCH THAT FIRST MAPPING TABLE CONTAINS MAPPINGS COMMON TO THE SECOND POINT-IN-TIME IMAGE AND THE LOGICAL VOLUME 930 | |
| | INCORPORATE THE THIRD MAPPING TABLE INTO THE HIERARCHY OF THE STRUCTURE AND ASSIGN A RANK HIGHER THAN THE FIRST MAPPING TABLE 932 | |
| | INCORPORATE THE FOURTH MAPPING TABLE INTO THE HIERARCHY OF THE STRUCTURE AND ASSIGN A RANK HIGHER THAN THE FIRST MAPPING TABLE 934 | |

HIERARCHY OF A STRUCTURE OF A VOLUME

FIELD OF TECHNOLOGY

This disclosure relates generally to the technical fields of data storage, and in one example embodiment, a method, apparatus and system of a hierarchy of a structure of a volume is disclosed.

BACKGROUND

An enterprise (e.g., a business, a multi-national company, a corporation, an organization, a group of organizations, virtual organizations, etc.) may employ many information technologies (e.g., data storage systems, security systems, encryption methods, etc) to sustain numerous data processing and/or data storage infrastructures, networks, systems, devices, and/or operations.

A data processing system (e.g., a computer, a calculator, a supercomputer, a robotic apparatus) may record data in a non-volatile storage device (e.g., computer memory that can retain the stored information even when not powered) and/or a volatile storage device (e.g., computer memory that requires power to maintain the stored information). The volatile storage device may be a random access memory (RAM) device, a dynamic random access memory (DRAM) device. The non-volatile storage device may be a peripheral unit (e.g., an optical disk, a magnetic disk, a magnetic tape and/or a flash memory card) that holds data. The storage device may be a hard disk, a SCSI device, a disk array (e.g., a RAID device) which may communicate (e.g., transfer, receive, and/or process data) with the data processing system through input/output channels of a central processing unit of the data processing system.

The storage device may be coupled to an enterprise storage system (e.g., a Storage Area Network (SAN)) that retrieves, archives, and recovers data of an enterprise. The storage device may also be coupled to a network (e.g., a Network-Attached Storage device). The storage device may also be coupled to a file system (e.g., a system to archive, to retrieve, to distribute, to modify, and/or to share files).

Additionally, the data processing system may employ a Logical Volume Management to allocate a space (e.g., a capacity to store data) of the storage device. The Logical Volume Management may include a physical volume (e.g., a hard disk, a hard disk partition, a LUN (Logical Unit Number)) to hold information (e.g., data). The physical volume may be in the form of a recording medium (e.g., a physical material that holds information expressed in a recording format). The Logical Volume Management may also include a logical volume (e.g., an abstraction and/or a virtualization of the physical volume, an equivalent of a UNIX partition). The logical volume may be a space of the storage device (e.g., a hard disk, a disk array, a hard disk partition).

The logical volume may be defined by a process applied to the physical volume. The physical volume may include an address space (e.g., amount of memory that can be addressed and/or mapped) which may be divided into physical extents (e.g., data segments of equal size (e.g., in number of bytes)) and may be rearranged and modified to form an address space of the logical volume. The address space of the logical volume may be characterized as a table to provide mappings between a logical address of the logical volume and a physical address of the physical volume. The logical volume may perform certain functions of the physical volume (e.g., associate with a file system, a Network-attached storage device, a swap file, a boot file, a block device (e.g., MS-DOS device file, a UNIX special file)).

Some logical volume management may also implement a snapshot application. The snapshot application may create a point-in-time image of the logical volume by applying a copy-on-write (COW) feature to each physical extent. The logical volume management may copy the physical extent to a table of the point-in-time image prior to writing to the physical extent. The point-in-time image may be stored on the storage device. The point-in-time image may preserve an old version of a logical extent (e.g., a data segment of the same size as the physical extents), which may later be reconstructed by overlaying the copy-on-write table on the current logical extents. The snapshot application may enable a disaster recovery of the physical volume. By keeping track of the changes to the logical volume and/or the physical volume, the snapshot may assist in returning the enterprise to a recent, working state of the physical volume. The point-in-time image may eventually run out of space as changes are made to the logical volume.

Implementing the Logical Volume Management of an enterprise may be a difficult and time-consuming task. As such, supporting the storage requirements for every computer application and data operation of each user in the enterprise is complicated. In addition, implementing the snapshot application may involve numerous data copy operations and may exceed a space allocated for the point-in-time image.

SUMMARY

A method, apparatus and system of a hierarchy of a structure of a volume is disclosed. In one aspect, a system includes a physical volume, a structure that may provide a mapping to a location of a data segment of the physical volume including a table (e.g., the table(s) may indicate a set of updates of the physical volume during a time period) having a hierarchy (e.g., the hierarchy of the table of the structure may be organized in the hierarchy according to rank determined by recency of each of the table), a logical volume management module that may define a logical volume as an arrangement of the physical volume, a snapshot module to automatically generate a point-in-time image of the logical volume and to prompt the logical volume management module to create a first table and a second table and to insert the first table and the second table into the hierarchy of the structure, the first table to provide the set of updates to the logical volume, the second table to provide the set of updates to the point-in-time image, thereby the structure to provide a set of common mappings of the point-in-time image and the logical volume and a data processing system to perform a write IO (Input/Output) operation and a read IO operation.

In addition, the system may include a remote replication module of a remote site to process and/or to archive the point-in-time image of the snapshot module to prevent damage to the data during a crisis of the physical volume to enable recovery of the physical volume. The system may further include a file system to provide a directory of files and/or to mount on the point-in-time image to define a snapshot volume and/or the logical volume, such that the snapshot volume to enable testing, maintenance and administration of the file system and the logical volume.

In another aspect, a method includes storing data of an enterprise in a physical volume, instantiating a logical volume that may provide an arrangement of the data of the physical volume, providing a hierarchical structure to indicate mappings between an address of the data of the logical volume and an address of the data of the physical volume, generating a point-in-time image of the logical volume, creating a first table to track modifications to the logical volume, associating the first table with the logical volume, and/or incorporating the first table into a structure and creating a second table to track modifications to the point-in-time image, associating the second table with the point-in-time image, and incorporating the second table into the structure.

The method may further include organizing table of the hierarchical structure according to a length of time since creation such that the first table and the second table to rank highest. The method may also include reorganizing table of the hierarchical structure after removing a table of the table. In addition, the method may include writing a data to a logical address of the logical volume by referencing a used entry of the logical address of the first table of the hierarchical structure, extracting a location information including a corresponding physical address of the physical volume, overwriting a previous data of the corresponding physical address, and updating the first table to indicate a mapping of the data.

Also, the method may include writing the data to a logical address of the logical volume by referencing an unused entry of the address of the first table of the hierarchical structure, allocating a data segment of the physical volume having a physical address, loading the data into the data segment, and updating the first table to indicate the mapping of the physical address of the data.

Similarly, the method may include writing the data to an address of the point-in-time image by referencing an used entry of the address of the second table of the hierarchical structure, extracting a location information including a corresponding physical address of the physical volume, overwriting a previous data of the corresponding physical address, and updating the second table to indicate the mapping of the data.

The method may also include writing the data to the address of the point-in-time image by referencing the unused entry of the address of the second table of the hierarchical structure, allocating a data segment having the physical address of the physical volume, loading the data into the data segment, and updating the second table to indicate the mapping of the physical address of the data.

In addition, the method may include reading the data of the logical address of the logical volume by referencing a last-in-time entry of the logical address in the table associated with the logical volume of the hierarchical structure, extracting the location information including the corresponding physical address of the physical volume, and retrieving the data of the corresponding physical address. Furthermore, the method may include reading the data of the logical address of the logical volume by referencing the unused entry of the logical address in each table associated with the logical volume of the hierarchical structure, determining an absence of the mapping of the logical address, and returning a zero-filled buffer.

Similarly, the method may include reading the data from the address of the point-in-time image by referencing the last-in-time entry of the address in the table associated with the point-in-time image of the hierarchical structure, extracting the location information including the corresponding physical address of the physical volume and/or retrieving the data of the corresponding physical address.

The method may also include reading the data of the address of the point-in-time image by referencing the unused entry of the address in each table associated with the logical volume of the hierarchical structure, determining the absence of the mapping of the logical address, and communicating the absence to a logical volume management module. Moreover, the method may include processing and archiving the point-in-time image in a remote site to prevent corruption and to enable recovery of the logical volume during a crisis. The method may include mounting a file system on the point-in-time image to define a snapshot volume to enable testing, maintenance, and administration of the logical volume and the file system.

In yet another aspect, an apparatus includes a printed circuit board that may enable a data processing system to communicate and interoperate with a storage device, a physical volume, a logical volume that may provide an array of data of the physical volume, a point-in-time image of the logical volume and a structure of the printed circuit board (e.g., the structure may organize the hierarchy of the each table by moment of creation such that an earliest table to rank lowest and/or a latest table to rank highest) having a hierarchy of the table that may provide mapped locations of data of the physical volume, each table may indicate updates during a specific time period of the logical volume and the point-in-time image.

In addition, the structure may contain a common table that may provide mappings to the physical volume common to the point-in-time image and/or the logical volume, a first table may provide updates to the logical volume, and/or a second table may provide updates to the point-in-time image such that the first mapping table and the second mapping table may branch from the common mapping table in the hierarchy of the structure.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a table view of a mapping table, according to one embodiment.

FIG. 6 is an interaction diagram of a process flow between a physical volume, a logical volume management module and a data processing system, according to one embodiment.

FIG. 7A is an interaction diagram of a process flow between the physical volume, the logical volume management module, and the data processing system to update an entry for the data, according to one embodiment.

FIG. 7B is an interaction diagram of a continuation of process flow of FIG. 7A showing additional operations, according to one embodiment.

FIG. 8 is an interaction diagram of a process flow between the physical volume, the logical volume management module, and the data processing system, according to one embodiment.

FIG. 9A is an interaction diagram of a process flow between the physical volume, the logical volume management module, and the data processing system to incorporate the mapping table into the hierarchy of the structure and assign the rank to the table, according to one embodiment.

FIG. 9B is an interaction diagram of a continuation of process flow of FIG. 9A showing additional operations, according to one embodiment.

Other features of the present embodiments will be apparent from the accompanying drawings and from the detailed description that follows.

DETAILED DESCRIPTION

A method, apparatus and system of a hierarchy of a structure of a volume is disclosed. In the following description, for the purposes of explanation, numerous specific details are set forth in order to provide a thorough understanding of the various embodiments. It will be evident, however to one skilled in the art that various embodiments may be practiced without these specific details.

Figure 3A:
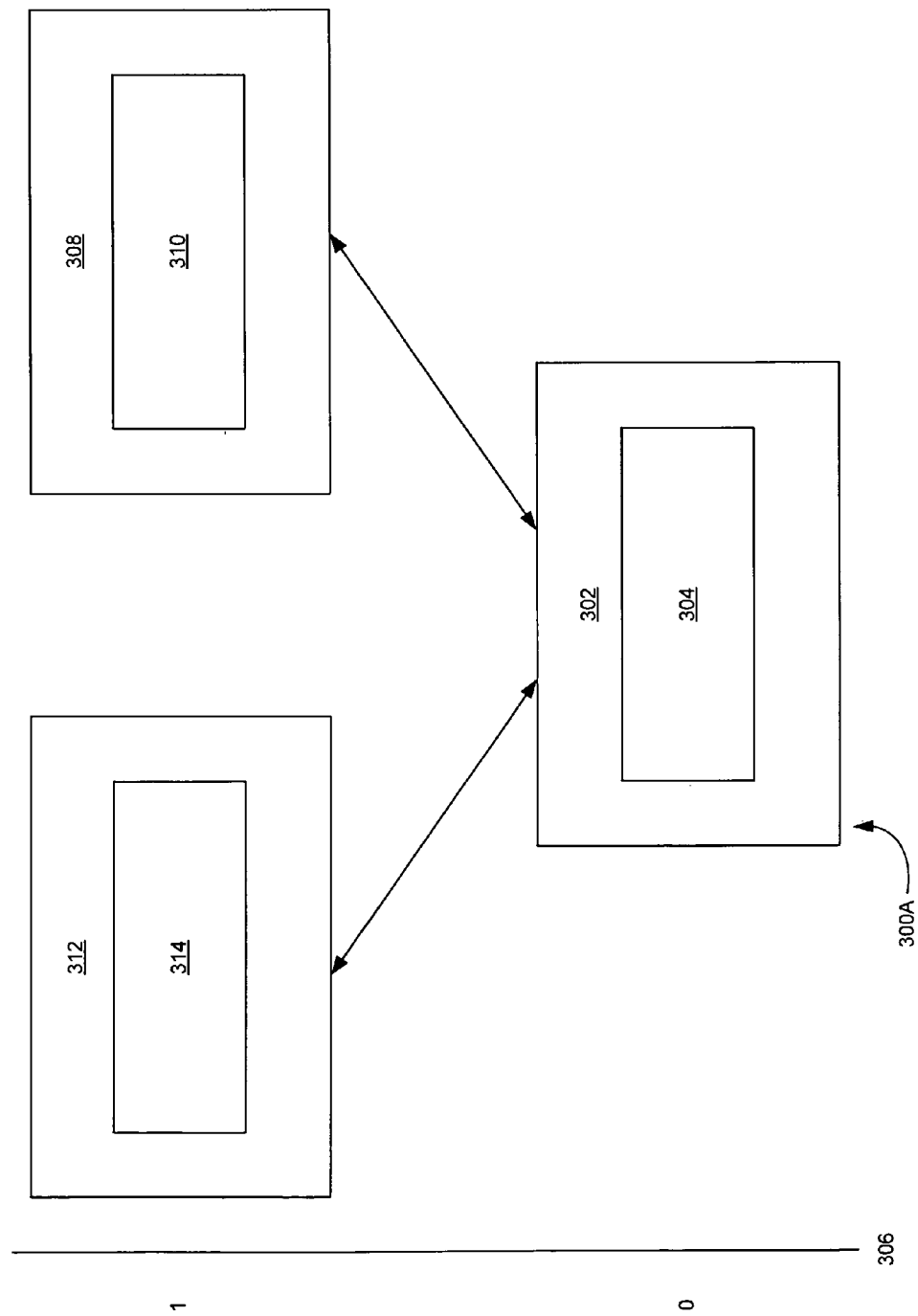
FIG. 3A is a hierarchy view of the hierarchy of structure of FIG. 1, according to one embodiment.
Figure 3B:
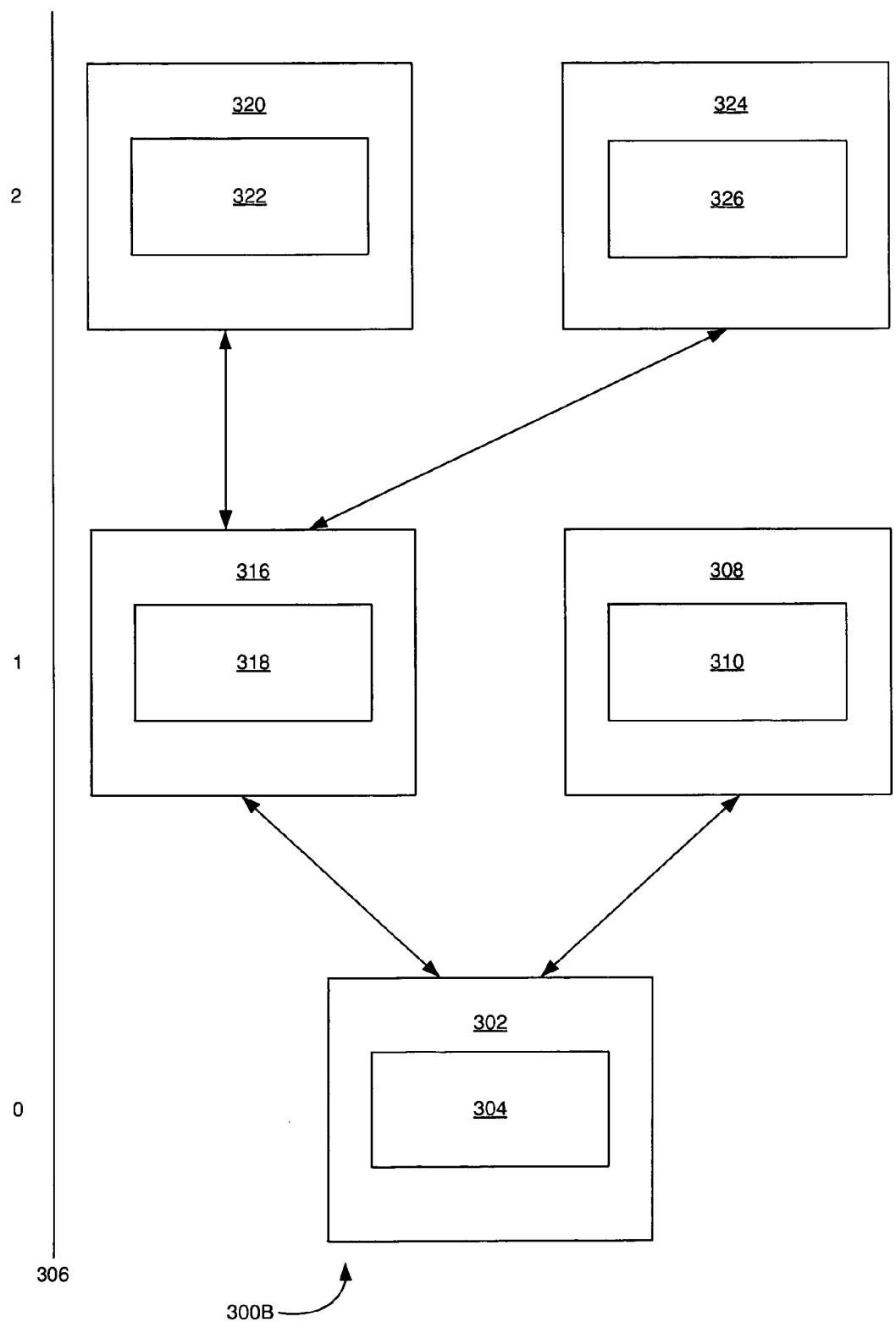
FIG. 3B is a hierarchy view of the hierarchy of structure of FIG. 1, according to one embodiment.

In one embodiment, a system includes a physical volume (e.g., the physical volume 104 of FIG. 1 and the physical volume 522 of Figure S), a structure (e.g., the structure 100A-N of FIG. 1) that may provide a mapping (e.g., the mapping view 500 of FIG. 5) to a location of a data segment of the physical volume (e.g., the physical volume 104 of FIG. 1) including a table (e.g., the table(s) may indicate a set of updates of the physical volume during a time period, the table A 302 of FIGS. 3A-B, the mapping table 400 of FIG. 4) having a hierarchy (e.g., the hierarchy of the table of the structure may be organized according to rank determined by recency of each of the table (e.g., through the hierarchical structure module 116 of FIG. 1)), a logical volume management module (e.g., the logical volume management module 110 of FIG. 1) that may define a logical volume (e.g., the logical volume 106 of FIG. 1 and logical volume 504 of FIG. 5) as an arrangement of the physical volume (e.g., the physical volume 104 of FIG. 1 and the physical volume 522 of FIG. 5), a snapshot module (e.g., the snapshot module 112 of FIG. 1) to automatically generate a point-in-time image (e.g., the point-in-time image 108 of FIG. 1 and/or the snapshot volume 506 of FIG. 5) of the logical volume (e.g., the logical volume 106 of FIG. 1 and logical volume 504 of FIG. 5) and to prompt the logical volume management module (e.g., the logical volume management module 110 of FIG. 1) to create a first table (e.g., the table B 312 of FIG. 3A, the table D 320 of FIG. 3B, the table, the mapping table 400 of FIG. 4) and a second table (e.g., the table C 308 of FIG. 3A—By the table E 324 of FIG. 3B, the mapping table 400 of FIG. 4) and to insert the first table and the second table (e.g., to create a reference of a physical location of the table A 302 of FIG. 3A—By to create a reference to a physical location of the table B 316 of FIG. 3B) into the hierarchy (e.g., the hierarchy view 300A-B of FIGS. 3A-B) of the structure (e.g., the structure 100A-N of FIG. 1), the first table to provide the set of updates to the logical volume (e.g., the updates to the logical volume after snapshot 314 of FIG. 3A, the updates to the logical volume after second snapshot 322 of FIG. 3B), the second table to provide the set of updates to the point-in-time image (e.g., the updates to the point-in-time image 310 of FIG. 3A—By the updates to second point-in-time image 326 of FIG. 3B), thereby the structure (e.g., the structure 100A-N of FIG. 1) to provide a set (e.g., a table (e.g., the table A 302 of FIG. 3A—By the table B 316 of FIG. 3B)) of common mappings (e.g., the common mappings of table B and table C 304 of FIGS. 3A-B, the common mappings of table D and table E 318 of FIG. 3B)) of the point-in-time image (e.g., the point-in-time image 108 of FIG. 1) and the logical volume (e.g., the logical volume 106 and logical volume 504 of FIG. 5) and a data processing system (e.g., the data processing system 122 of FIG. 1) to perform a write (e.g., the write module 120 of FIG. 1) 110 (e.g., input/output) operation and a read (e.g., the read module 118 of FIG. 1) 110 (e.g., input/output) operation.

Figure 5:
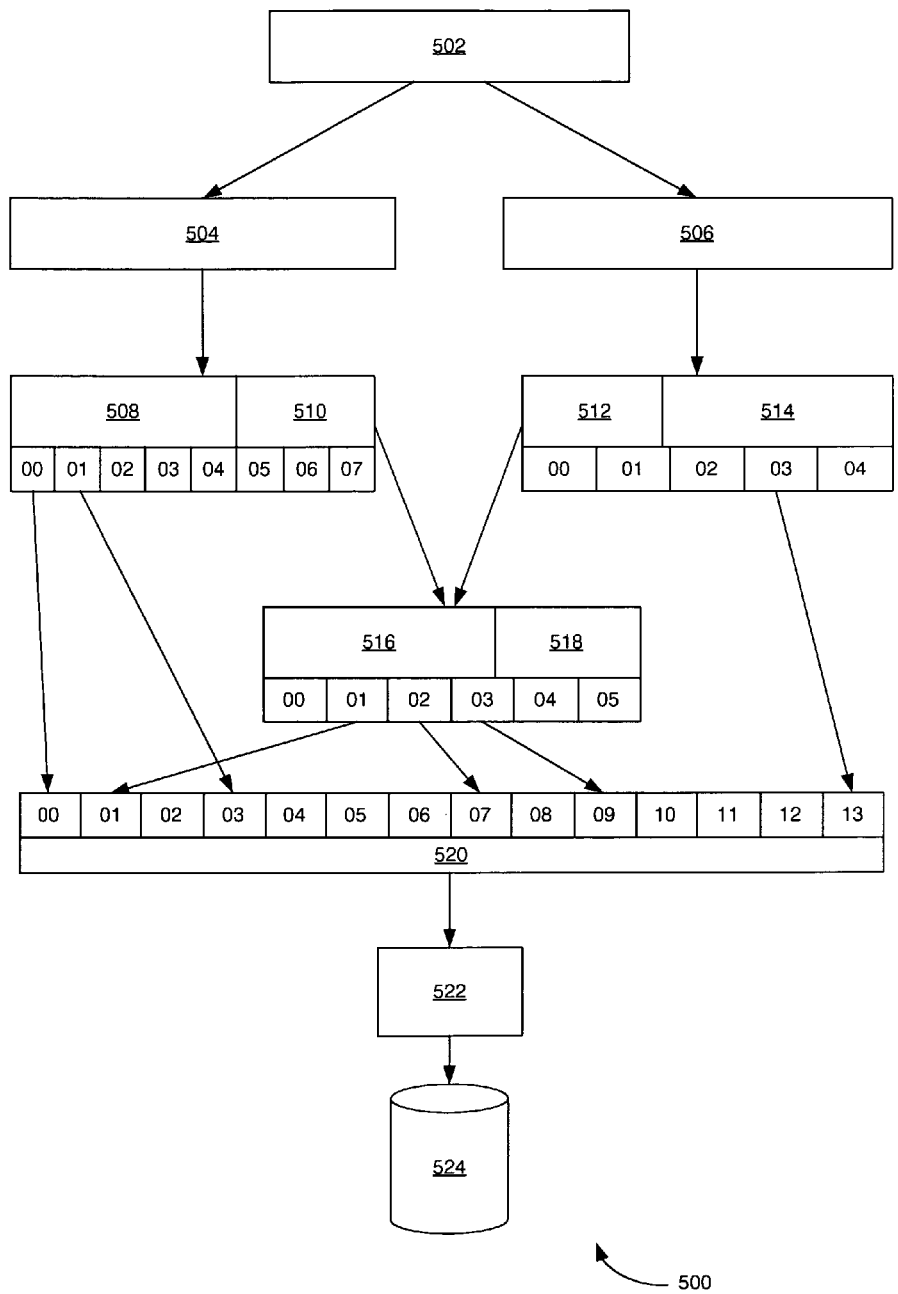
FIG. 5 is a mapping view of a file system having a logical volume address space and a snapshot volume address space to map to a physical volume address space, according to one embodiment.

In another embodiment, a method includes storing data of an enterprise in a physical volume (e.g., the physical volume 104 of FIG. 1 and the physical volume 522 of FIG. 5), instantiating a logical volume (e.g., the logical volume 106 of FIG. 1 and logical volume 504 of FIG. 5) that may provide an arrangement of the data of the physical volume (e.g., the physical volume 104 of FIG. 1), providing a hierarchical structure (e.g., through the hierarchical structure module 116 of FIG. 1, 2) to indicate mappings between an address of the data of the logical volume and an address of the data of the physical volume (e.g., a mapping table entry between the logical address (index) field 404 to the physical address field 410 of FIG. 4, mapping(s) to data blocks of the physical volume address space 520 from data blocks of any one of the logical volume address space 508, the common mappings 516, and the snapshot volume address space 514 of FIG. 5), generating a point-in-time image (e.g., the point-in-time image of FIG. 1, the point-in-time image may also be the snapshot volume address space 514 of FIG. 5 when mounted by file system 502 of FIG. 5) of the logical volume (e.g., the logical volume 106 and logical volume 504 of FIG. 1, 5), creating a first table (e.g., the table B 312 of FIG. 3A, the table D 320 of FIG. 3B) to track modifications to the logical volume (e.g., the updates to the logical volume after snapshot 314 of FIG. 3A, the updates to the logical volume after second snapshot 322 of FIG. 3B), associating the first table with the logical volume (e.g., the logical volume address space 508 of FIG. 5), and/or incorporating the first table into a structure (e.g., referencing a location of a table of highest rank of the structure (e.g., the common mappings 516 of FIG. 5) in the reference 510 of FIG. 5) and creating a second table (e.g., the table C 308 of FIG. 5 and the table E 324 of FIG. 5) to track modifications to the point-in-time image (e.g., the updates to the point-in-time image 310 of FIGS. 3A-B, the updates to second point-in-time image 326 of FIGS. 3A-B), associating the second table with the point-in-time image (e.g., the snapshot volume address space 514 of FIG. 5), and incorporating the second table into the structure (e.g., referencing a location of a table of highest rank of the structure (e.g., the common mappings 516 of FIG. 5) in the reference 512 of FIG. 5).

Figure 1:
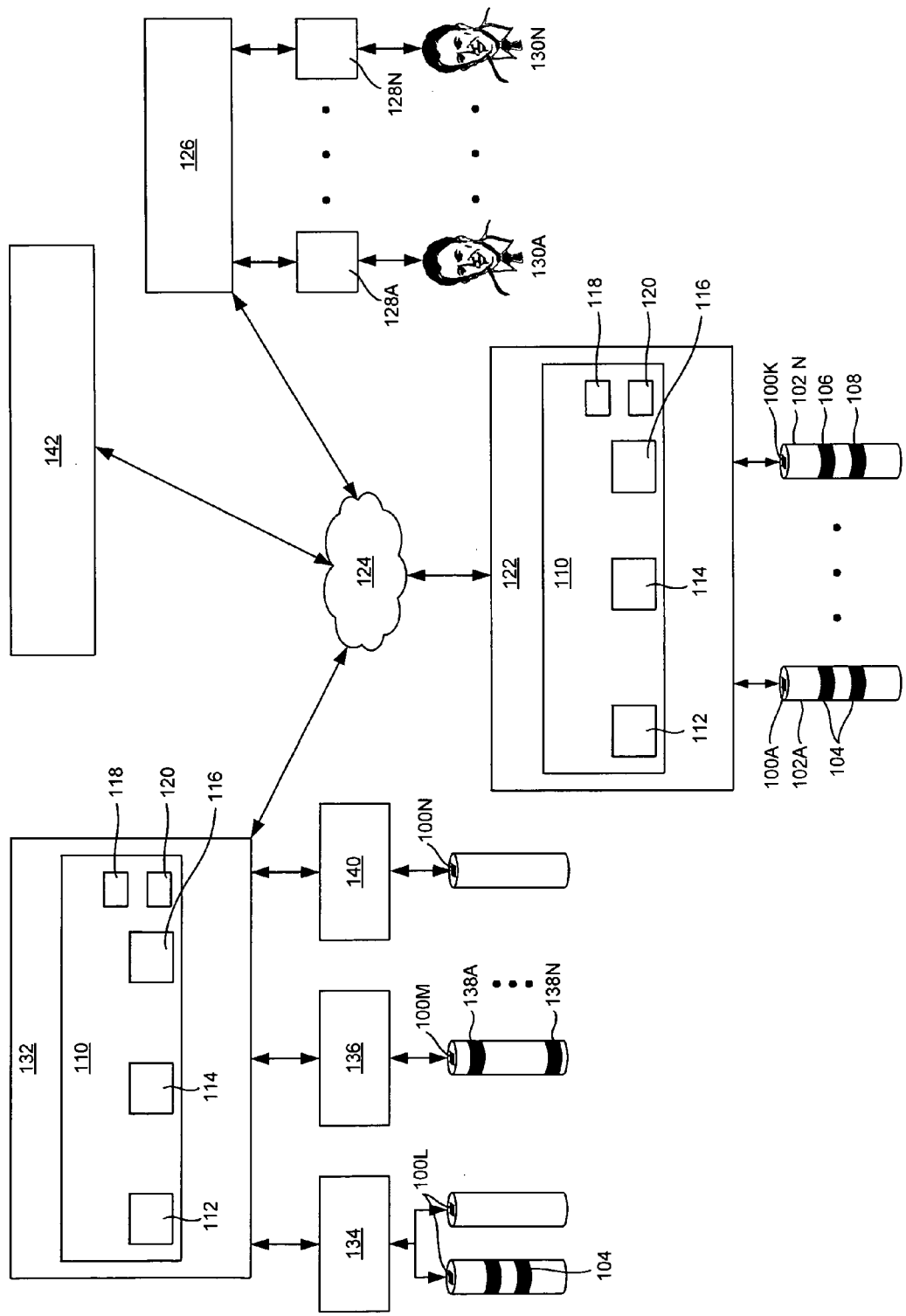
FIG. 1 is a system view of storing data of an enterprise in a physical volume, according to one embodiment.

In yet another embodiment, an apparatus includes a printed circuit board that may enable a data processing system (e.g., the data processing system 122 of FIG. 1) to communicate and interoperate (e.g., through the mapping(s) of the hierarchical structure (e.g., the structure 100A-N of FIG. 1) with a storage device (e.g., the storage device 102 of FIG. 1), a physical volume (e.g., the physical volume 104 of FIG. 1), a logical volume (e.g., the logical volume 106 of FIG. 1 and logical volume 504 of FIG. 5) that may provide an array of data (e.g., data blocks of the common mappings 516 of FIG. 5, data blocks of the logical volume address space 508 of FIG. 5) of the physical volume (e.g., data blocks of the physical volume address space 520 of FIG. 5)), a point-in-time image (e.g., the point-in-time image 108 of FIG. 1, data blocks of the snapshot volume address space 514 of FIG. 5) of the logical volume and a structure (e.g., the structure 100A-N of FIG. 1) of the printed circuit board (e.g., the structure may organize the hierarchy of the each table by moment of creation such that an earliest table to rank lowest and/or a latest table to rank highest) having a hierarchy (e.g., the hierarchy view 300A-B of FIGS. 3A-B) of the table that may provide mapped locations of data of the physical volume (e.g., the mapping view 500 of FIG. 5), each table may indicate updates during a specific time period of the logical volume (e.g., the logical volume 106 of FIG. 1 and logical volume 504 of FIG. 5) and the point-in-time image (e.g., the point-in-time image 108 of FIG. 1).

FIG. 1 is a system view of storing and/or managing data of an enterprise in a physical volume 104, according to one embodiment. Particularly, FIG. 1 illustrates a structure 100A-N, a storage device 102A-N, the physical volume 104, a logical volume 106, a point-in-time image 108, a logical volume management module 110, a snapshot module 112, a mapping module 114, a hierarchical structure module 116, a read module 118, a write module 120, a data processing system 122, a network 124, a LAN 126, a device 128, a user 130, a data storage system 132, a SAN 134, a SCSI storage 136, a NAS 140 and a remote replication module 142, according to one embodiment.

The structure 100 may provide a mapping of a location of a data segment of the physical volume 104 including a table (e.g., the table(s) may indicate a set of updates of the physical volume during a time period) having a hierarchy (e.g., the hierarchy of the table of the structure may be organized in the hierarchy according to rank determined by recency of each of the table). The storage device 102 may be a non-volatile storage device (e.g., a computer memory that may retain the stored information even when not powered) and/or a volatile storage device (e.g., the computer memory that requires power to maintain the stored information) that may communicate the data through the input/output channels (e.g., the input/output channel module 208 of FIG. 2).

A physical volume 104 may store data of an enterprise and/or may include an address space (e.g., amount of memory that can be addressed and/or mapped) which may be divided into physical extents (e.g., data segments of equal size (e.g., in number of bytes)) and/or may be rearranged and modified to form the address space of the logical volume 106. The logical volume 106 may be defined by a process applied to the physical volume (e.g., the physical volume 104 of FIG. 1) and/or may include an address space (e.g., amount of memory that can be addressed and/or mapped) which may be divided into physical extents (e.g., data segments of equal size (e.g., in number of bytes)) and may be rearranged and modified to form an address space of the logical volume 106.

The point-in-time image 108 may facilitate preservation of an old version of a used logical extent (e.g., the data segment of the same size as the physical extents which maps to a data segment of the physical volume), which may be retained in a mapping entry of the old version of the used logical extent of the structure 100A-N without a copy operation (e.g., the common mappings 516 of FIG. 5). The logical volume management module 110 may define the logical volume 106 as an arrangement of an address space of the physical volume 104 of the storage devices 102A-N that may be more flexible than conventional partitioning schemes (e.g., through the logical volume allocation module). The snapshot module 112 may enable a disaster recovery of the physical volume 104 and/or may keep a track of the changes of the logical volume 106 and/or the physical volume 104, and/or may assist in returning the enterprise to a recent working state of the physical volume 104 and/or the logical volume 106.

The mapping module 114 may create mapping of data element between two distinct data models and may be a first step in creating a data transformation between a data source and a destination. The hierarchical structure module 116 may organize structure 100A-N in the hierarchy according to rank determined by recency of each of the table. The read module 118 may read the data of the logical address of the logical volume 106 by referencing an unused entry (e.g., a free data block) of the logical address (e.g., the logical address (index) field 404 of FIG. 4) in each table associated with the logical volume of the hierarchical structure. The read module 118 may also read the data of the address of the point-in-time image 108 by referencing an unused entry (e.g., a free data block) of the address in each table associated with point-in-time image 108 of the hierarchical structure. The read module 118 may also read the data of the address of any of the logical volume 106 by referencing a used entry (e.g., a mapped data block) of the table associated with the logical volume 106 of the structure 100A-N and extracting an information from the used entry. The read module 118 may also read the data of the address of any of the point-in-time image 108 by referencing a used entry (e.g., a mapped data block) of the table associated with the point-in-time image 108 of the structure 100A-N and extracting an information from the used entry.

The write module 120 may write the data to the logical address (e.g., the logical address (index) field 404 of FIG. 4) of the logical volume 106 by referencing a used entry (e.g., a mapped data block) and/or an unused entry (e.g., a free data block) of the first table of the hierarchical structure. The write module 120 may also write the data to an address of the point-in-time image 108 by referencing a used entry (e.g., a mapped data block) and/or an unused entry (e.g., a free data block) of the address of the second table of the hierarchical structure.

The data processing system 122 (e.g., a computer, a calculator, a supercomputer, a robotic apparatus) may record (e.g., process, keep a note, etc.) data in a non-volatile storage device (e.g., the computer memory that may retain the stored information even when not powered) and/or a volatile storage device (e.g., computer memory that may require power to maintain the stored information). The network 124 may be associated with the communication between computer systems used for storing and/or retrieving the volume of data. The LAN 126 (Local Area Network) may be a computer network covering a local area (e.g., a home, office, and/or group of buildings) that may allow the user 130 to communicate with the data processing system 122 and the data storage system 132 through the device 128A-N.

The device 128 may be a standard input/output, which simplifies many tasks and/or operations of the user 130. The user 130 may be a person an individual and/or an enterprise (e.g., a business, a multi-national company, a corporation, an organization, a group of organizations, virtual organizations, etc.) that may access the information stored in the storage device 102 through the device 128. The data storage system 132 may record data in a non-volatile storage device (e.g., the computer memory that may retain the stored information even when not powered) and/or a volatile storage device (e.g., the computer memory that requires power to maintain the stored information).

The SAN 134 (Storage Area Network) may retrieve, archive, and/or recover data of an enterprise (e.g., a business, a multinational company, a corporation, an organization, a group of organizations, virtual organization, etc.). The SCSI storage 136 (Small Computer System Interface) may be a standard interface and may command set for transferring data between devices on both internal and external computer buses. The NAS 140 (Network-attached storage) may be a data storage technology that may be connected directly to a computer network (e.g., the network 124 of FIG. 1) to provide centralized data access and storage to heterogeneous network clients.

The remote replication module 142 may be a remote site to process and/or to archive the point-in-time image 108 of the snapshot module 112 to prevent damage to the data during a crisis of the physical volume and may enable recovery of the data of the physical volume 104.

In example embodiments illustrated in FIG. 1, the data processing system 122 may communicate with the user 130 through LAN 126 (Local Area Network) and device 128, the data storage system 132 and the remote replication module 142 through the network 124. The data storage system 132 as illustrated in FIG. 1 may communicate with the storage device 102 through SAN 134, SCSI storage 136 and/or NAS 140.

For example, a system includes a physical volume (e.g., the physical volume 104 of FIG. 1), a structure (e.g., the structure 100 of FIG. 1) that may provide a mapping to a location of a data segment of the physical volume (e.g., the physical volume 104 of FIG. 1) including the table (e.g., the table may indicate a set of updates of the physical volume during a time period) having a hierarchy, a logical volume management module (e.g., the logical volume management module 110 of FIG. 1) that may define a logical volume (e.g., the logical volume 106 of FIG. 1 and logical volume 504 of FIG. 5) as an arrangement of the physical volume (e.g., the physical volume 104 of FIG. 1), a snapshot module (e.g., the snapshot module 112 of FIG. 1) that may automatically generate a point-in-time image (e.g., the point-in-time image 108 of FIG. 1) of the logical volume (e.g., the logical volume 106 of FIG. 1 and logical volume 504 of FIG. 5) and may prompt the logical volume management module (e.g., the logical volume management module 110 of FIG. 1) to create a first table and a second table and to insert the first table and the second table into the hierarchy of the structure (e.g., the hierarchy of the table of the structure may be organized in the hierarchy according to rank determined by recency of each of the table), the first table may provide the set of updates to the logical volume (e.g., the logical volume 106 of FIG. 1 and logical volume 504 of FIG. 5), the second table may provide the set of updates to the point-in-time image (e.g., the point-in-time image 108 of FIG. 1), thereby the structure (e.g., the structure 100 of FIG. 1) may provide a set of common mappings (e.g., through mapping module 114 of FIG. 1,2) of the point-in-time image (e.g., the point-in-time image 108 of FIG. 1) and the logical volume (e.g., the logical volume 106 of FIG. 1 and logical volume 504 of FIG. 5), and a data processing system (e.g., the data processing system 122 of FIG. 1) that may perform a write IO operation (e.g., through write module 120 of FIG. 1,2) and a read IO operation (e.g., through read module 118 of FIG. 1,2).

Furthermore, the system may include a remote replication module (e.g., the remote replication module 142 of FIG. 1) of a remote site to process and/or to archive the point-in-time image (e.g., the point-in-time image 108 of FIG. 1) of the snapshot module (e.g., the snapshot module 112 of FIG. 1) to prevent damage to the data during a crisis of the physical volume (e.g., the physical volume 104 of FIG. 1) to enable recovery of the physical volume (e.g., the physical volume 104 of FIG. 1). The method may also include processing and archiving the point-in-time image (e.g., the point-in-time image 108 of FIG. 1) in the remote site to prevent corruption and/or to enable recovery of the logical volume (e.g., the logical volume 106 of FIG. 1 and logical volume 504 of FIG. 5) during a crisis.

An apparatus includes a printed circuit board (e.g., a controller (e.g., a disk array controller)) that may enable a data processing system (e.g., the data processing system 122 of FIG. 1) to communicate and/or interoperate with a storage device (e.g., the storage device 102 of FIG. 1), the physical volume (e.g., the physical volume 104 of FIG. 1), the logical volume (e.g., the logical volume 106 of FIG. 1 and logical volume 504 of FIG. 5) that may provide an array of data of the physical volume (e.g., the physical volume 104 of FIG. 1), the point-in-time image (e.g., the point-in-time image 108 of FIG. 1) of the logical volume (e.g., the logical volume 106 of FIG. 1 and logical volume 504 of FIG. 5) and the structure (e.g., the structure 100 of FIG. 1) of the printed circuit board having a hierarchy of table to provide mapped locations of data of the physical volume (e.g., the physical volume 104 of FIG. 1), each table may indicate updates during a specific time period the logical volume (e.g., the logical volume 106 of FIG. 1 and logical volume 504 of FIG. 5) and the point-in-time image (e.g., the point-in-time image 108 of FIG. 1).

The apparatus may also include a garbage collector application to copy a used entry of an address of a lower ranked table associated with the logical volume (e.g., the logical volume 106 of FIG. 1 and logical volume 504 of FIG. 5) and/or the point-in-time image (e.g., the point-in-time image 108 of FIG. 1) to an unused entry of the address of a higher ranked table of the logical volume (e.g., the logical volume 106 of FIG. 1 and logical volume 504 of FIG. 5) and the point-in-time image (e.g., the point-in-time image 108 of FIG. 1).

Figure 2:
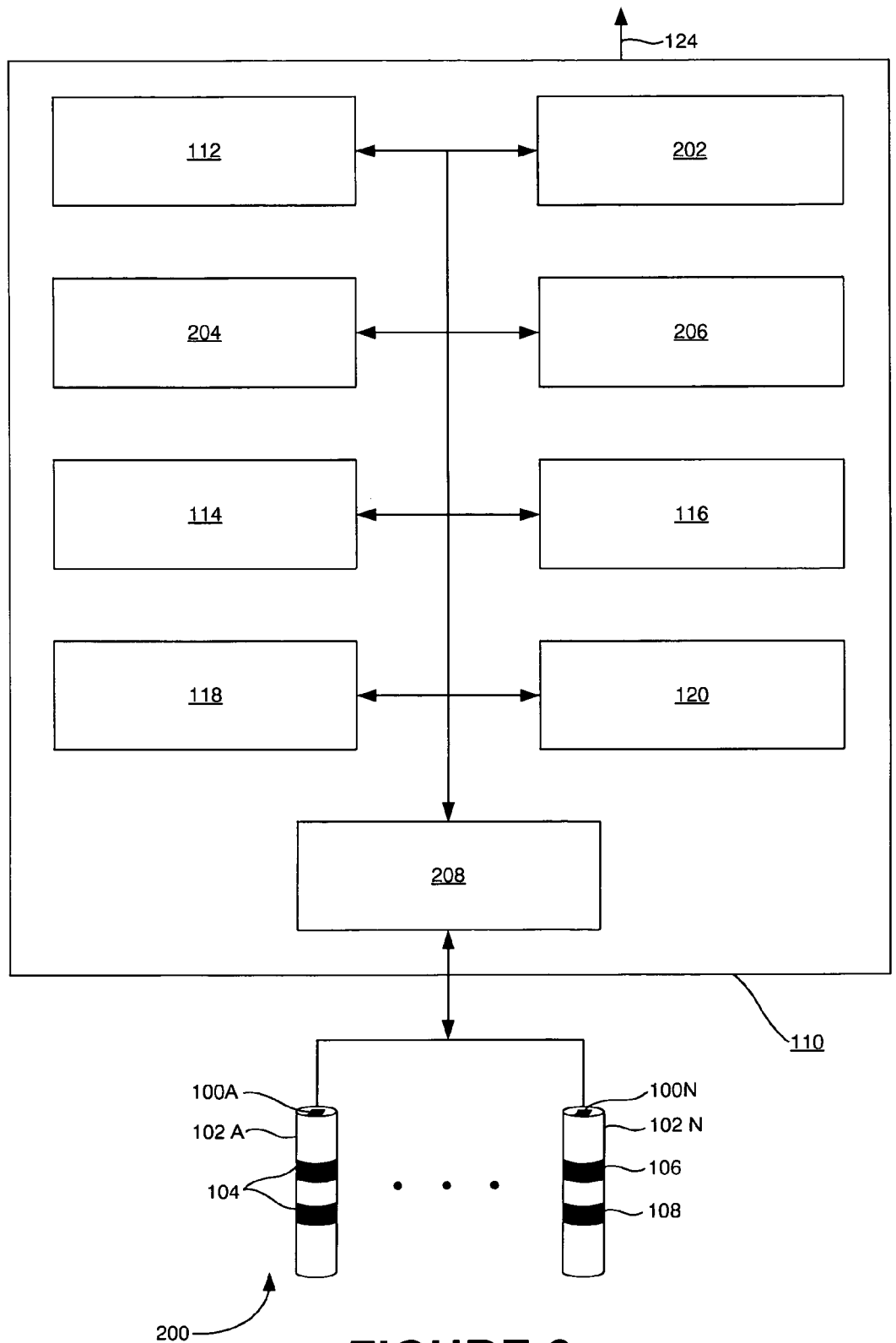
FIG. 2 is an exploded view of a logical volume management module of FIG. 1, according to one embodiment.

FIG. 2 is an exploded view of a logical volume management module 110 of FIG. 1, according to one embodiment. Particularly, FIG. 2 illustrates the snapshot module 112, the mapping module 114, the read module 118, the write module 120, a network communication module 202, a physical volume allocation module 204, a logical volume allocation module 206 and an input/output channel module 208.

The network communication module 202 may manage communication between the network 124 and the logical volume management module 110. The physical volume allocation module 204 may allocate an address space of the storage device 102A-N (e.g., a partition of a recording material [[)]] for the physical volume 104). The logical volume allocation module 206 may provide an abstraction and/or a virtualization of data of the physical volume 104. The input/output channel module 208 may enable communication (e.g., transfer, receive, and/or process data) of data between logical volume management module 110 (e.g., using the input/output channels of the data processing system and/or data storage system) and the storage devices 102A-N (e.g., a hard disk, a SCSI device, a disk array, etc).

In example embodiment illustrated in FIG. 2, the network communication module 202 communicates with the structure 100A-N, the storage device 102A-N, the physical volume 104, the logical volume 106, the point-in-time image 108, the snapshot module 112, the mapping module 114, the read module 118, the write module 120, physical volume allocation module 204, the logical volume allocation module 206, and the input/output channel module 208. The physical volume allocation module 204 communicates with the structure 100A-N, the storage device 102A-N, the physical volume 104, the logical volume 106, the point-in-time image 108, the snapshot module 112, the mapping module 114, the read module 118, the write module 120, the network communication module 202, the logical volume allocation module 206, and the input/output channel module 208. The logical volume allocation module 206 communicates with the structure 100A-N, the storage device 102A-N, the physical volume 104, the logical volume 106, the point-in-time image 108, the snapshot module 112, the mapping module 114, the read module 118, the write module 120, the network communication module 202, the physical volume allocation module 204, and the input/output channel module 208. The input/output channel module 208 communicates with the structure 100A-N, the storage device 102A-N, the logical volume 106, the point-in-time image 108, the snapshot module 112, the mapping module 114, the read module 118, the write module 120, the network communication module 202, physical volume allocation module 204 and the logical volume allocation module 206.

For example, a method includes storing data of an enterprise in a physical volume (e.g., the physical volume 104 of FIG. 1), instantiating a logical volume (e.g., the logical volume 106 of FIG. 1 and logical volume 504 of FIG. 5) to provide an arrangement of the data of the physical volume (e.g., the physical volume 104 of FIG. 1), providing a hierarchical structure (e.g., the hierarchical structural module 116 of FIG. 1,2) to indicate mappings between an address of the data of the logical volume (e.g., the logical volume 106 of FIG. 1 and logical volume 504 of FIG. 5) and an address of the data of the physical volume (e.g., the physical volume 104 of FIG. 1), generating a point-in-time image (e.g., the point-in-time image 108 of FIG. 1) of the logical volume (e.g., the logical volume 106 of FIG. 1 and logical volume 504 of FIG. 5), creating a first table to track modifications to the logical volume (e.g., the logical volume 106 of FIG. 1 and logical volume 504 of FIG. 5), associating the first table with the logical volume (e.g., the logical volume 106 of FIG. 1 and logical volume 504 of FIG. 5), and/or incorporating the first table into a structure (e.g., the structure 100 of FIG. 1) and creating a second table to track modifications to the point-in-time image (e.g., the point-in-time image 108 of FIG. 1), associating the second table with the point-in-time image (e.g., the point-in-time image 108 of FIG. 1), and incorporating the second table into the structure (e.g., the structure 100A-N of FIG. 1).

In addition, the method may include writing (e.g., the write module 120 of FIGS. 1-2) a data to a logical address of the logical volume (e.g., the logical volume 106 of FIG. 1 and logical volume 504 of FIG. 5) by referencing a used entry of the logical address of the first table of the hierarchical structure (e.g., the hierarchical structure module 116 of FIG. 1,2), extracting a location information including a corresponding physical address of the physical volume (e.g., the physical volume 104 of FIG. 1), overwriting a previous data of the corresponding physical address, and updating the first table to indicate a mapping (e.g., through mapping module 114 of FIG. 1) of the data.

The method may further include writing the data to a logical address of the logical volume (e.g., the logical volume 106 of FIG. 1 and logical volume 504 of FIG. 5) by referencing an unused entry of the address of the first table of the hierarchical structure (e.g., the hierarchical structure module 116 of FIG. 1,2), allocating a data segment of the physical volume (e.g., the physical volume 104 of FIG. 1) having a physical address, loading the data into the data segment, and updating the first table to indicate the mapping (e.g., through mapping module 114 of FIG. 1) of the physical address of the data.

Furthermore, the method may include writing (e.g., using the write module 120 of FIGS. 1-2) the data to an address of the point-in-time image (e.g., the point-in-time image 108 of FIG. 1) by referencing an used entry of the address of the second table of the hierarchical structure, extracting a location information including a corresponding physical address of the physical volume (e.g., the physical volume 104 of FIG. 1), overwriting a previous data of the corresponding physical address, and updating the second table to indicate the mapping (e.g., the mapping module 114 of FIG. 1,2) of the data.

The method may include writing (e.g., using the write module 120 of FIGS. 1-2) the data to the address of the point-in-time image (e.g., point-in-time image 108 of FIG. 1) by referencing the unused entry of the address of the second table of the hierarchical structure, allocating a data segment having the physical address of the physical volume (e.g., the physical volume 104 of FIG. 1), loading the data into the data segment, and updating the second table to indicate the mapping of the physical address of the data.

The method may also include reading (e.g., using the write module 120 of FIGS. 1-2) the data of the logical address of the logical volume by referencing a last-in-time entry of the logical address in the table associated with the logical volume (e.g., the logical volume 106 of FIG. 1 and logical volume 504 of FIG. 5) of the hierarchical structure (e.g., the hierarchical structure module 116 of FIG. 1,2), extracting the location information including the corresponding physical address of the physical volume (e.g., the physical volume 104 of FIG. 1), and retrieving the data of the corresponding physical address.

Moreover, the method may include reading the data of the address of the point-in-time image (e.g., point-in-time image 108 of FIG. 1) by referencing the unused entry of the address in each table associated with the logical volume (e.g., the logical volume 106 of FIG. 1 and logical volume 504 of FIG. 5) of the hierarchical structure, determining the absence of the mapping of the logical address, and communicating the absence to a logical volume management module (e.g., the logical volume management module 110 of FIG. 1).

FIG. 3A is a hierarchy view 300A of the hierarchy of the structure 100A-N of FIG. 1, according to one embodiment. Particularly, FIG. 3A illustrates the hierarchy view 300A, a table 302, a common mappings of table B and table C 304, a rank 306, a table C 308, a updates to the point-in-time image 310, a table B 312, and a updates to the logical volume after snapshot 314.

FIG. 3A illustrates the hierarchy view 300A of the structure 100A-N which may be organized in the hierarchy according to the rank 306 determined by the recency of the each table. In the example embodiments illustrated in FIG. 3A, the table A 302 may provide the common mappings of the table B 312 (e.g., the mapping table 400 of FIG. 4) of the logical volume (e.g., the logical volume 106 of FIG. 1 and logical volume 504 of FIG. 5) and the table C 308 (e.g., the mapping table 400 of FIG. 4) of the point-in-time image, and may also be ranked lowest in the hierarchy of the structure 100A-N and may be ranked lower than the table B 312 and/or the table C 308. The common mappings between table B and table C 304 may be mappings between data blocks of the logical volume and data blocks of the physical volume (e.g., the physical volume address space 520 of FIG. 5) prior to the snapshot (e.g., the common mappings 516 of FIG. 5). The rank 306 may indicate the rank of a table (e.g., the table A 302, the table B 312, and the table C 308) of the hierarchy determined by the recency of the table. In example embodiment illustrated in FIG. 3A, the table A 302 is ranked lower (i.e., rank of "0") than the table B 312 and table C 308 (i.e., rank of "1").

The table C 308 may be a mapping table (e.g., the mapping table 400 of FIG. 4), which may be associated with the updates to the point-in-time image 310, assigned a rank higher than the table A 302, and incorporated into the structure 100A-N as the second mapping table of the point-in-time image. The updates to the point-in-time image 310 may be mappings (e.g., writes to the point-in-time image after the snapshot) between data blocks of the point-in-time image (e.g., the snapshot volume address space 514 of FIG. 5) and data blocks of the physical volume (e.g., the physical volume address space 520 of FIG. 5).

The table B 312 may be a mapping table (e.g., the mapping table 400 of FIG. 4), which may be associated with the updates to the logical volume after the snapshot 314, assigned a rank higher than the table A 302, and incorporated into the structure 100A-N as the first mapping table of the logical volume (e.g., the logical volume 106 of FIG. 1 and logical volume 504 of FIG. 5). The updates to the logical volume after snapshot 314 may be mappings (e.g., writes to the logical volume after the snapshot) between data blocks of the logical volume (e.g., the logical volume address space 508 of FIG. 5) and data blocks of the physical volume (e.g., the physical volume address space 520 of FIG. 5).

For example, the method may include organizing table of the hierarchical structure (e.g., the structure to organize the hierarchy of the table by moment of creation such that an earliest table to rank lowest and a latest table to rank highest) according to a length of time since creation such that the first table and the second table to rank highest. The method may also include reorganizing table of the hierarchical structure (e.g., using the hierarchical structure module 116 of FIGS. 1-2) after removing a table of the at least one table.

FIG. 3B is a hierarchy view 300B of the hierarchy of structure 100 of FIG. 1, according to one embodiment. Particularly, FIG. 3A illustrates the hierarchy view 300B, the table A 302, the common mappings of table B and table C 304, the rank 306, the table C 308, the updates to the point-in-time image 310, a table B 316, a common mappings of table D and table E 318, a table D 320, a updates to the logical volume after a second snapshot 322, a table E 324, and a updates to second point-in-time image 326.

FIG. 3B illustrates the hierarchy view 300B of the structure 100A-N organized in the hierarchy according to the rank 306 determined by the recency of the each table. In the example embodiments illustrated in FIG. 3B, the table B 316 may be a mapping table (e.g., the mapping table 400 of FIG. 4) and may provide the common mappings of table D and table E 318 of the logical volume (e.g., the logical volume 106 of FIG. 1 and logical volume 504 of FIG. 5) and the table E 324 of the second point-in-time image. The table B 316 may be ranked lower than the table D 320 and the table E 324 in the hierarchy of the structure 100A-N and may be assigned a rank higher than the table A 302 in the hierarchy of the structure 100A-N. The common mappings of table D and table E 318 may be mappings between data blocks of the logical volume and data blocks of the physical volume (e.g., the physical volume address space 520 of FIG. 5) prior to the second snapshot and after the snapshot (e.g., the common mappings 516 of FIG. 5).

The table D 320 may be a mapping table (e.g., the mapping table 400 of FIG. 4), which may be associated with the updates to the logical volume after the second snapshot 322, assigned a rank higher than the table A 302, the table B 316, and/or the table C 308, and incorporated into the structure 100A-N as the third mapping table (e.g., the first mapping table created after the second snapshot) of the logical volume (e.g., the logical volume 106 of FIG. 1 and logical volume 504 of FIG. 5). The updates to the logical volume after the second snapshot 322 may be mappings (e.g., writes to the logical volume after the second snapshot) between data blocks of the logical volume (e.g., the logical volume address space 508 of FIG. 5) and data blocks of the physical volume (e.g., the physical volume address space 520 of FIG. 5).

The table E 324 may be a mapping table (e.g., the mapping table 400 of FIG. 4), which may be associated with the updates to the second point-in-time image 326, assigned a rank higher than the table A 302 the table B 316, and/or the table C 308, and incorporated into the structure 100A-N as the fourth mapping table (e.g., the first mapping table created after the second snapshot) of the second point-in-time image. The updates to the second point-in-time image 326 may be mappings (e.g., writes to the point-in-time image after the second snapshot) between data blocks of the second point-in-time image (e.g., the snapshot volume address space 514 of FIG. 5) and data blocks of the physical volume (e.g., the physical volume address space 520 of FIG. 5).

In example embodiment illustrated in FIG. 3B, the table A 302 is ranked lower (i.e., rank of 0) than the table B 316 and table C 308 (i.e., rank of 1) in the hierarchy of the structure 100A-N. Furthermore, the table B 316 is ranked lower (i.e., rank of 1) than the table D 320 and table E 324 (i.e., rank of 2) in the hierarchy of the structure 100A-N.

FIG. 4 is a table view of a mapping table 400, according to one embodiment. Particularly, FIG. 4 illustrates the mapping table 400, a LVID field 402, a logical address (index) field 404, a size of extent field 406, a PVID field 408, a physical address field 410, a reference to location of lower ranked table field 412, according to one embodiment.

The mapping table 400 may provide information of mappings between the logical volume (e.g., the logical volume 106 of FIG. 1 and the logical volume 504 of FIG. 5) to the physical volume (e.g., the physical volume 104 of FIG. 1). The LVID field 402 may indicate an identification (e.g., location in the file system) of the logical volume. The logical address (index) field 404 may indicate an index of an address space of the logical volume (e.g., the index may correspond to a block of data of the logical volume) accessed by an application program in a system (e.g., a computer, a calculator, a supercomputer, a robotic apparatus) such that intervening computer hardware and/or software maps the logical address to physical volume (e.g., the physical volume 104 of FIG. 1). The size of extent field 406 may indicate the size (e.g., in bytes) of the extents in a number system (e.g., decimal, binary, and/or hexidecimal).

The PVID field 408 may indicate the physical volume identification (e.g., location and/or partition of the physical disk) associated with a stored data. The physical address field 410 may indicate an address of the physical volume (e.g., location of the block of data of the physical volume) containing the stored data (e.g., mapped from the logical volume (e.g., the logical volume 106 of FIG. 1 and logical volume 504 of FIG. 5)). The reference to location of lower ranked table

416 field may indicate a phsyical address (e.g., location of the physical disk) of a lower ranked mapping table.

The LVID field 402 displays "1" in the first row, "2" in the second row and "2" in the third row of the LVID field 402 column of the mapping table 400 illustrated in FIG. 4. The logical address (index) field 404 displays "0" in the first row, "1" in the second row, "2" in the third row of the logical address (index) field 404 column of the mapping table 400 illustrated in FIG. 4. The size of extent field 406 displays "0x400000" in the first row and "0x400000" in the second row of the size of extent field 406 column of the mapping table 400 illustrated in FIG. 4.

The PVID field 408 displays "1" in the first row and "1" in the second row of the PVID field 408 column of the mapping table 400 illustrated in FIG. 4. The physical address field 410 displays "0xFF" in the first row, "0x1FF" in the second row, "free" in the third row of the physical address field 410 column of the mapping table 400 illustrated in FIG. 4.

FIG. 5 is a mapping view 500 of a file system 502 having a logical volume address space 508 and a snapshot volume address space 514 to map to a physical volume address space 520, according to one embodiment. Particularly, FIG. 5 illustrates the mapping view 500, the file system 502, a logical volume 504, a snapshot volume 506, a logical volume address space 508, a reference 510, a reference 512, a snapshot volume address space 514, a common mappings 516, a reference 518, a physical volume address space 520, the physical volume 522, a storage device 524, according to one embodiment.

The file system 502 may be a disk file system, a database file system, a transactional file system, a network file system, a special purpose file system that may be implemented to provide a directory of files and/or to mount on the point-in-time image (e.g., the point-in-time image 108 of FIG. 1) to define the snapshot volume 506 and/or the logical volume 504. The file system 502 may also be implemented to organize and represent access to any data stored in the storage device (e.g., the storage device 524) and/or dynamically generated from the network connection (e.g., the SAN 134, the SCSI storage 136, and/or the NAS 140 of the data storage system 132 and/or the device 126A-N of the user 130A-N of the LAN 126).

The logical volume 504 may be a directory (e.g., an address space) instantiated and/or configured by the file system 502 to provide an arrangement of data of the physical volume 522. The logical volume 504 may be defined by a process applied to the physical volume 522. The snapshot volume 506 may enable testing, maintenance and/or administration of the file system 502 and the logical volume 504. The snapshot volume 506 may consist of mappings to a set of files and directories that may be stored on the storage device 524 to enable recovery of physical volume 522 during crisis of the physical volume 522.

The logical volume address space 508 may be an address space capacity (e.g., range of data blocks) of the logical volume 504 that may hold addresses of the respective physical location of the data (e.g., the physical address). The logical volume address space 508 may be characterized as a table (e.g., the mapping table 400 of FIG. 4) to provide mappings between a logical address of the logical volume 504 and a physical address of the physical volume 522. The reference 510 may be a reference to a location of a table in the hierarchy of the structure.

The reference 512 may be may be a reference to a location of another table (e.g., of lower rank (e.g., the common mappings 516)) in the hierarchy of the structure. The snapshot volume address space 514 may be address space capacity (e.g., range of data blocks) of the snapshot volume 506 (e.g., the point-in-time image (e.g., the point-in-time image 108 of FIG. 1)) that may hold the addresses of the respective physical location of the stored data (e.g., the physical address).

The common mappings 516 may provide mappings to the physical volume common to the snapshot volume 506 and the logical volume 504. The reference 518 may be may be a reference to a location of another table (e.g., of lower rank (e.g., a common mappings table of a previous snapshot)) in the hierarchy of the structure.

The physical volume address space 520 may include an address space (e.g., amount of physical memory (e.g., data) that can be addressed and/or mapped) that may be divided into physical extents (e.g., data segments of equal size (e.g., in number of bytes)). The physical volume 522 may be a storage (e.g., internal hard drive, hard drive partition, external hard drive, RAID devices) that may hold the data associated with the enterprise (e.g., a business, a multi-national company, a corporation, an organization, a group of organizations, virtual organizations, etc.).

The storage device 524 (e.g., volatile storage device, non-volatile storage device, etc) may communicate the data associated with enterprise (e.g., a business, a multi-national company, a corporation, an organization, a group of organizations, virtual organizations, etc.). The storage device 524 (e.g., the storage device 102A-N, the LUN 138A-N (Logical Unit Number), the NAS 140 (Network Attached Storage)) may be coupled to a file system (e.g., the file system 502), a network (e.g., the network 124), and a enterprise storage system (e.g., the SAN 134 (Storage Area Network), the SCSI storage 136) to archive, to retrieve, to distribute, to modify, and/or to share files.

For example, the system may include a file system (e.g., the file system 502 of FIG. 5) that may provide a directory of files and may mount on the point-in-time image (e.g., the point-in-time image of FIG. 5) to define a snapshot volume (e.g., the snapshot volume 506 of FIG. 5) and the logical volume (e.g., the logical volume 106 of FIG. 1 and logical volume 504 of FIG. 5), such that the snapshot volume (e.g., the snapshot volume 506 of FIG. 5) may enable testing, maintenance and administration of the file system and the logical volume (e.g., the logical volume 106 of FIG. 1 and logical volume 504 of FIG. 5).

Also, the method may include mounting a file system (e.g., the file system 502 of FIG. 5) on the point-in-time image (e.g., the point-in-time image 108 of FIG. 1) to define a snapshot volume to enable testing, maintenance, and administration of the logical volume (e.g., the logical volume 106 of FIG. 1 and logical volume 504 of FIG. 5) and the file system (e.g., the file system 502 of FIG. 5).

Furthermore, the structure (e.g., the structure 100A-N of FIG. 1) may include a common table (e.g., the mapping table 400 of FIG. 4, the common mappings 516 of FIG. 5, the table A 302 of FIGS. 3A-B, and/or the table B 316 of FIG. 3B) to provide mappings (e.g., the mapping view 500 of FIG. 5) to the physical volume (e.g., the physical volume 104 of FIG. 1) common to the point-in-time image (e.g., the point-in-time image 108 of FIG. 1) and the logical volume (e.g., the logical volume 106 of FIG. 1 and logical volume 504 of FIG. 5), a first table (e.g., the mapping table 400 of FIG. 4, the logical volume address space 508, the table B 312 of FIG. 3A, the table D 320 of FIG. 3B) to provide updates to the logical volume (e.g., the logical volume 106 of FIG. 1 and logical volume 504 of FIG. 5), and a second table (e.g., the mapping table 400 of FIG. 4, the snapshot volume address space 514, the table C 308 of FIGS. 3A-B, the table E of FIG. 3B) to provide updates to the point-in-time image (e.g., the point-in-time image 108 of FIG. 1) such that the first table and the second table to branch from the common table in the hierarchy (e.g., the hierarchy view 300A-B of FIGS. 3A-B) of the structure.

FIG. 6 is an interaction diagram of a process flow between a physical volume 104, a logical volume management module 110 and a data processing system 122 of FIG. 1, according to one embodiment. In operation 602, the logical volume management module 110 may provide a logical volume and/or a number of point-in-time images of the logical volume, and/or a structure having a hierarchy of mapping tables. In operation 604, the physical volume 104 may store data in a space of a storage device (e.g., the storage device 102A-N, the SAN 134, the LUN 138A-N of the SCSI storage 136, and/or the NAS 140 of FIG. 1, etc.).

In operation 606, the data processing system 122 may process a read IO request from an application. In operation 608, the logical volume management module 110 may look up the logical address in each mapping table associated with the logical volume (e.g., the logical volume 106 of FIG. 1 and logical volume 504 of FIG. 5) according to descending rank starting with the highest ranked mapping table. In operation 610, the logical volume management module 110 may find an entry for the logical address.

In operation 612, the logical volume management module 110 may extract location and/or address information of a physical address from the entry. In operation 614, the logical volume management module 110 may use input/output channels (e.g., the input/output channel module 208 of FIG. 2) to retrieve the data from the physical address. In operation 616, the physical volume 104 may return the data stored (e.g., the storage device 102 of FIG. 1) in the physical address. In operation 618, the data processing system 122 may process the data.

In operation 620, the data processing system 122 may process read IO request from an application. In operation 622, the logical volume management module 110 may look up the logical address in each mapping table associated with the logical volume (e.g., the logical volume 106 of FIG. 1 and logical volume 504 of FIG. 5) according to the descending rank starting with the highest ranked mapping table. In operation 624, the logical volume management module 110 may find an unmapped, unused entry for the logical address in each associated mapping table. In operation 626, the physical volume 104 may return a zero-filled buffer.

FIG. 7A is an interaction diagram of a process flow between the physical volume 104, the logical volume management module 110, and the data processing system 122 of FIG. 1 to update an entry for the data, according to one embodiment. In operation 702, the data processing system 122 may allocate space for a logical volume on a storage device. In operation 704, the logical volume management module 110 may define a logical volume (e.g., the logical volume 106 of FIG. 1 and logical volume 504 of FIG. 5), a common mapping table, and a structure having a hierarchy and assigns the common mapping table a rank in the hierarchy.

In operation 706, the physical volume 104 may store the data in a space of a storage device. In operation 708, the data processing system 122 may partition space for a point-in-time image (e.g., the point-in-time image 108 of FIG. 1) on a storage device (e.g., the storage device 102 of FIG. 1). In operation 710, the logical volume management module 110 may instantiate the point-in-time image (e.g., the point-in-time image 108 of FIG. 1) of the logical volume (e.g., the logical volume 106 of FIG. 1 and logical volume 504 of FIG. 5). In operation 712, the logical volume management module 110 may create a first table associated with the logical volume (e.g., the logical volume 106 of FIG. 1 and logical volume 504 of FIG. 5), create a second table associated with the point-in-time image (e.g., the point-in-time image 108 of FIG. 1) and associate the common mapping table with the logical volume (e.g., the logical volume 106 of FIG. 1 and logical volume 504 of FIG. 5) and the point-in-time image (e.g., the point-in-time image 108 of FIG. 1).

In operation 714, the logical volume management module 110 may incorporate the first mapping table of the logical volume (e.g., the logical volume 106 of FIG. 1 and logical volume 504 of FIG. 5) into the hierarchy of the structure and assigns a rank higher than the common mapping table. In operation 716, the logical volume management module 110 may incorporate the second mapping table of the logical volume into the hierarchy of the structure and assigns a rank higher than the common mapping table. In operation 718, the data processing system 122 may perform a write 10 operation to a first logical address of the logical volume (e.g., the logical volume 106 of FIG. 1 and logical volume 504 of FIG. 5).

In operation 720, the logical volume management module 110 may look up the logical address in the first table and may find an unmapped logical address. In operation 722, the physical volume 104 may allocate a free data block and/or may write (e.g., the write module 120 of FIG. 1, 2) the data to the free data block. In operation 724, the logical volume management module 110 may create a new entry of the first table having the logical address, the physical address, and a location of the physical volume (e.g., the physical volume 104 of FIG. 1).

In operation 726, the physical volume 104 may store the first mapping table having the updated entry in the structure (e.g., structure 100A-N) of the physical volume (e.g., the physical volume 104 of FIG. 1). In operation 728, the data processing system 122 may perform a write IO operation to an address of the point-in-time image (e.g., the point-in-time image 108 of FIG. 1). In operation 730, the logical volume management module 110 may look up the address in the second table and may find an unmapped address.

FIG. 7B is an interaction diagram of a continuation of process flow of FIG. 7A showing additional operations, according to one embodiment. In operation 732, the logical volume management module 110 may create a new entry in the second table having the address, physical address, and location information of the physical volume (e.g., the physical volume 104 of FIG. 1). In operation 734, the physical volume 104 may allocate a free data block, write the data to the free data block, and return the physical address.

In operation 736, the physical volume 104 may store the second mapping table having a new entry in the structure (e.g., structure 100A-N) of the physical volume (e.g., the physical volume 104 of FIG. 1). In operation 738, the data processing system 122 may perform a write IO operation to the first logical address of the logical volume (e.g., the logical volume 106 of FIG. 1 and logical volume 504 of FIG. 5).

In operation 740, the logical volume management module 110 may look up the logical address in the first table. In operation 742, the logical volume management module 110 may find an entry in the table for the logical volume address. In operation 744, the logical volume management module 110 may extract location and address information of a physical address from the entry.

In operation 746, the logical volume management module 110 updates the entry for the data. In operation 748, the physical volume 104 may overwrite the data in the physical address. In operation 750, the physical volume 104 may store the second mapping table having the modified entry in the structure (e.g., structure 100A-N) of the physical volume (e.g., the physical volume 104 of FIG. 1).

FIG. 8 is an interaction diagram of a process flow between the physical volume 104, the logical volume management module 110, and the data processing system 122 of the FIG. 1, according to one embodiment. In operation 802, the logical volume management module 110 may define a logical volume (e.g., the logical volume 106 of FIG. 1 and logical volume 504 of FIG. 5), a common mapping table, and a structure having a hierarchy and may assign the common mapping table a rank in the hierarchy.

In operation 804, the physical volume 104 may allocate space for a logical volume (e.g., the logical volume 106 of FIG. 1 and logical volume 504 of FIG. 5). In operation 806, the data processing system 122 may mount the file system on the logical volume (e.g., the logical volume 106 of FIG. 1 and logical volume 504 of FIG. 5). In operation 808, the physical volume 104 may partition space for a point-in-time image (e.g., the point-in-time image 108 of FIG. 1). In operation 810, the logical volume management module 110 may instantiate a point-in-time image (e.g., the point-in-time image 108 of FIG. 1) of the logical volume. In operation 812, the logical volume management module 110 may create a first mapping and a second mapping table.

In operation 814, the logical volume management module 110 may associate the first mapping table with the logical volume (e.g., the logical volume 106 of FIG. 1 and logical volume 504 of FIG. 5), associate the second mapping table with the point-in-time image (e.g., the point-in-time image 108 of FIG. 1), and associate the common mapping table with the logical volume (e.g., the logical volume 106 of FIG. 1 and logical volume 504 of FIG. 5) and the point-in-time image (e.g., the point-in-time image 108 of FIG. 1). In operation 816, the logical volume management module 110 may incorporate the first mapping table of the logical volume into the hierarchy of structure and assign a rank higher than the common mapping table.

In operation 818, the logical volume management module 110 may incorporate the second mapping table of the point-in-time image (e.g., the point-in-time image 108 of FIG. 1) into the hierarchy of structure and assigns a rank higher than the common mapping table. In operation 820, the data processing system 122 may unmount the file system. In operation 822, the data processing system 122 may mount file system on point-in-time image (e.g., the point-in-time image 108 of FIG. 1) to create snapshot volume (e.g., the snapshot volume 506 of FIG. 5).

In operation 824, the physical volume 104 may allocate the space and the storage data of a write IO operation to a free data block of the point-in-time image (e.g., the point-in-time image 108 of FIG. 1). In operation 826, the logical volume management module 110 may update the second mapping table of the point-in-time image (e.g., the point-in-time image 108 of FIG. 1). In operation 828, the data processing system 122 may perform a number of Write 10 and/or Read IO operations on the snapshot volume (e.g., the snapshot volume 506 of FIG. 5) to create the modified file system. In operation 830, the data processing system 122 may test the modified file system (e.g., the file system 502 of FIG. 5). In operation 832, the data processing system 122 may unmount the file system (e.g., the file system 502 of FIG. 5).

FIG. 9A is an interaction diagram of a process flow between the physical volume 104, the logical volume management module 110, and the data processing system 122 of FIG. 1 to incorporate the mapping table into the hierarchy of the structure and assign the rank to the table, according to one embodiment. In operation 902, the logical volume management module 110 may define a logical volume, a common mapping table, and a structure having a hierarchy and assigns the common mapping table a rank in the hierarchy. In operation 904, the physical volume 104 may allocate space for a logical volume (e.g., the logical volume 106 of FIG. 1 and logical volume 504 of FIG. 5).

In operation 906, the physical volume 104 may partition space for the first point-in-time image (e.g., the point-in-time image 108 of FIG. 1). In operation 908, the logical volume management module 110 may instantiate a point-in-time image (e.g., the point-in-time image 108 of FIG. 1) of the logical volume (e.g., the logical volume 106 of FIG. 1 and logical volume 504 of FIG. 5) and the common mapping table. In operation 910, the logical volume management module 110 may create a first table associated with the logical volume (e.g., the logical volume 106 of FIG. 1 and logical volume 504 of FIG. 5), a second table associated with the first point-in time image (e.g., the point-in-time image 108 of FIG. 1) and may associate the common mapping table with the logical volume (e.g., the logical volume 106 of FIG. 1 and logical volume 504 of FIG. 5) and the first point-in-time image (e.g., the point-in-time image 108 of FIG. 1).

In operation 912, the logical volume management module 110 may incorporate the first mapping table of the logical volume (e.g., the logical volume 106 of FIG. 1 and logical volume 504 of FIG. 5) into the hierarchy of the structure and assign the rank higher than the common mapping table. In operation 914, the logical volume management module 110 may incorporate the second mapping table of the first point-in-time image (e.g., the point-in-time image 108 of FIG. 1) into the hierarchy of structure and assign a rank higher than the common mapping table. In operation 916, the data processing system 122 may perform a number of Write IO and Read IO operations on the logical volume (e.g., the logical volume 106 of FIG. 1 and logical volume 504 of FIG. 5) and the first point-in-time image (e.g., the point-in-time image 108 of FIG. 1).

In operation 918, the physical volume 104 may allocate space and store data of a Write IO operation to a free data block of the point-in-time image (e.g., the point-in-time image 108 of FIG. 1) or a free data block of the logical volume (e.g., the logical volume 106 of FIG. 1 and logical volume 504 of FIG. 5). In operation 920, the logical volume management module 110 may update the first mapping table and the second mapping table. In operation 922, the data processing system 122 may backup the logical volume.

In operation 924, the logical volume management module 110 may instantiate a second point-in-time image (e.g., the logical volume 106 of FIG. 1 and logical volume 504 of FIG. 5) of the logical volume (e.g., the logical volume 106 of FIG. 1 and logical volume 504 of FIG. 5). In operation 926, the physical volume 104 may partition the space for a second point-in-time image (e.g., the point-in-time image 108 of FIG. 1). In operation 928, the logical volume management module 110 may create a third table associated with the logical volume (e.g., the logical volume 106 of FIG. 1 and logical volume 504 of FIG. 5) and may create a fourth table associated with the second point-in-time image (e.g., the point-in-time image 108 of FIG. 1).

FIG. 9B is an interaction diagram of a continuation of process flow of FIG. 9A showing additional operations, according to one embodiment. In operation 930, the logical volume management module 110 may associate with first mapping table with the logical volume (e.g., the logical volume 106 of FIG. 1 and logical volume 504 of FIG. 5) and the second point-in-time (e.g., the point-in-time image 108 of FIG. 1) image such that first mapping table contains mappings common to the second point-in-time image and the logical volume.

In operation 932, the logical volume management module 110 may incorporate the third mapping table into the hierarchy of the structure and/or assigns a rank higher than the first mapping table. In operation 934, the logical volume management module 110 may incorporate the fourth mapping table into the hierarchy of the structure and assign a rank higher than the first mapping table.

Figure 10:
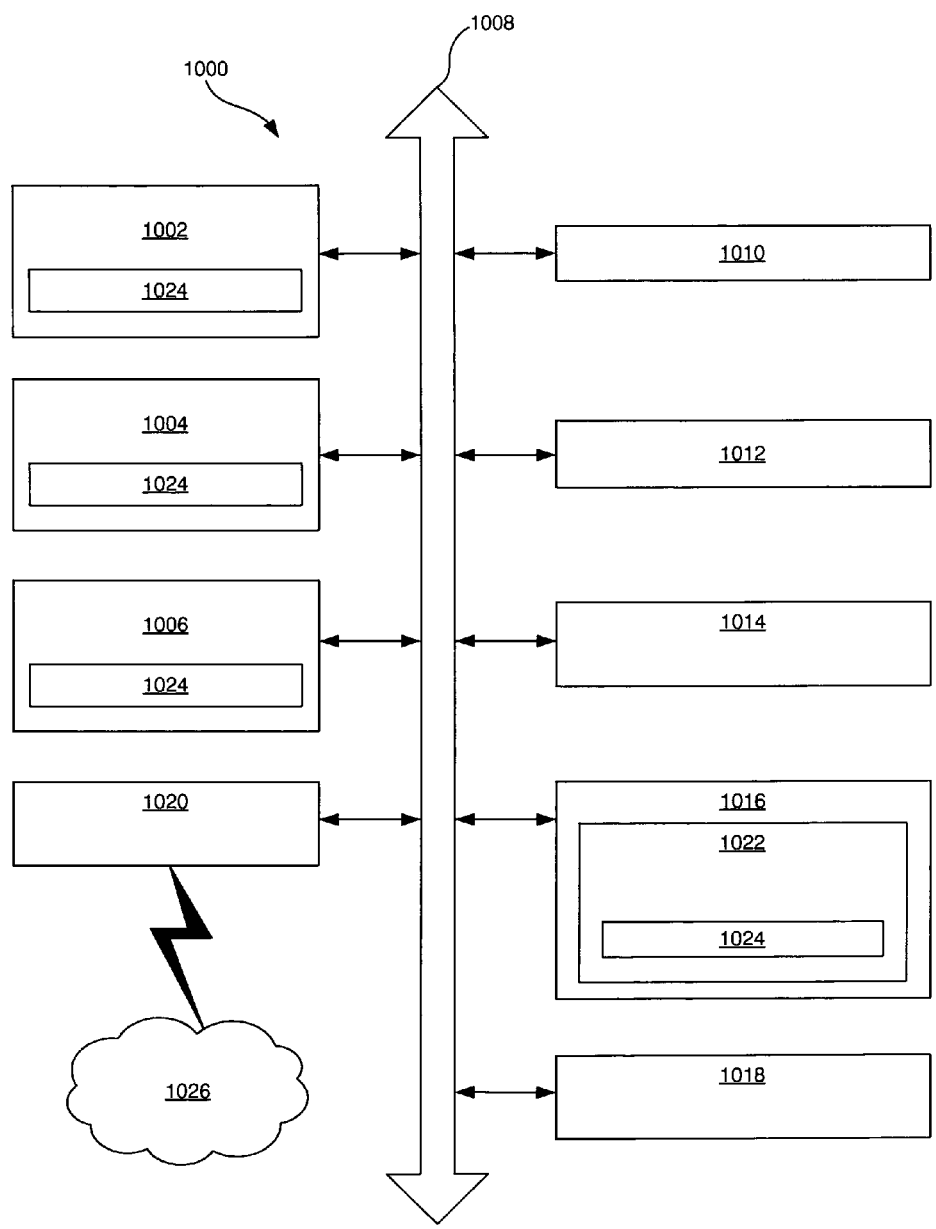
FIG. 10 is a diagrammatic representation of a data processing system capable of processing a set of instructions to perform any one or more of the methodologies herein, according to one embodiment.

FIG. 10 is a diagrammatic system view 1000 of a data processing system in which any of the embodiments disclosed herein may be performed, according to one embodiment. Particularly, the diagrammatic system view 1000 of FIG. 10 illustrates a processor 1002, a main memory 1004, a static memory 1006, a bus 1008, a video display 1010, an alpha-numeric input device 1012, a cursor control device 1014, a drive unit 1016, a signal generation device 1018, a machine readable medium 1022, instructions 1024, and a network 1026, according to one embodiment.

The diagrammatic system view 1000 may indicate a personal computer and/or a data processing system in which one or more operations disclosed herein are performed. The processor 1002 may be microprocessor, a state machine, an application specific integrated circuit, a field programmable gate array, etc. (e.g., Intel® Pentium® processor). The main memory 1004 may be a dynamic random access memory and/or a primary memory of a computer system.

The static memory 1006 may be a hard drive, a flash drive, and/or other memory information associated with the data processing system. The bus 1008 may be an interconnection between various circuits and/or structures of the data processing system. The video display 1010 may provide graphical representation of information on the data processing system. The alpha-numeric input device 1012 may be a keypad, keyboard and/or any other input device of text (e.g., a special device to aid the physically handicapped).

The cursor control device 1014 may be a pointing device such as a mouse. The drive unit 1016 may be a hard drive, a storage system, and/or other longer term storage subsystem. The signal generation device 1018 may be a bios and/or a functional operating system of the data processing system. The machine readable medium 1022 may provide instructions on which any of the methods disclosed herein may be performed. The instructions 1024 may provide source code and/or data code to the processor 1002 to enable any one/or more operations disclosed herein.

Figure 11A:
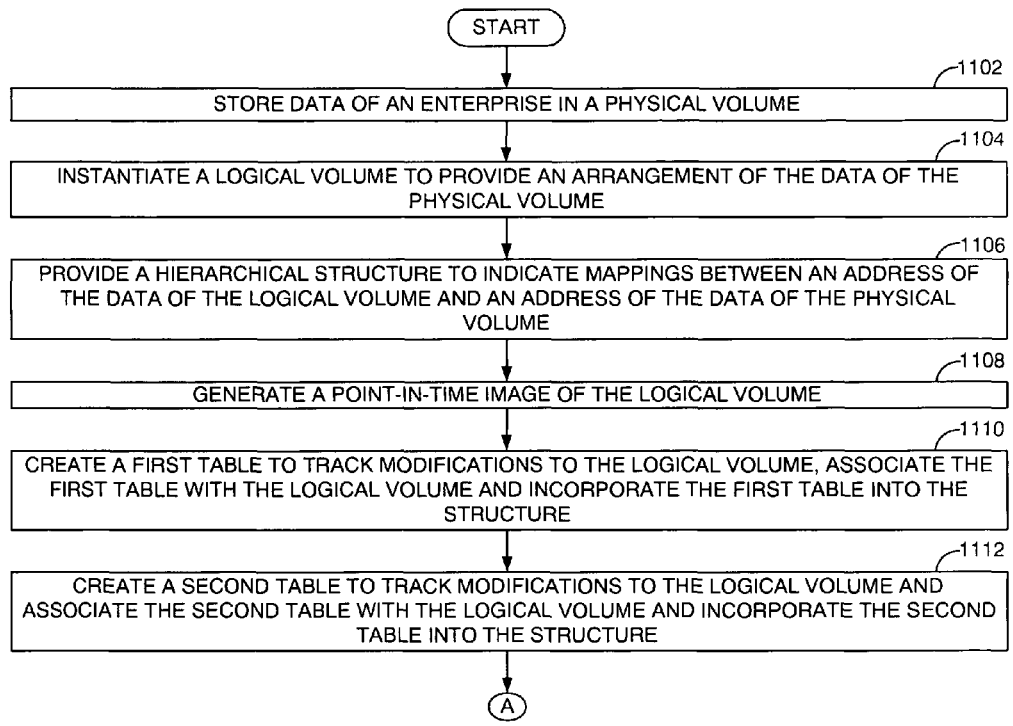
FIG. 11A is a process flow storing a storing data of an enterprise in a physical volume, according to one embodiment.

FIG. 11A is a process flow storing a storing data of an enterprise in a physical volume, according to one embodiment. In operation 1102, data of an enterprise may be stored in a physical volume (e.g., the physical volume 104,520 of FIGS. 1-2, 5). In operation 1104, a logical volume (e.g., the logical volume 106, 504 of FIGS. 1-2, 5) may be instantiated to provide an arrangement of the data of the physical volume (e.g., the physical volume 104,520 of FIGS. 1-2, 5).

In operation 1106, a hierarchical structure (e.g., the hierarchical structure module 116 of FIG. 1) may be provided to indicate mappings between an address of the data of the logical volume (e.g., the logical volume 106, 504 of FIGS. 1-2, 5) and an address of the data of the physical volume (e.g., the physical volume 104,520 of FIGS. 1-2, 5). In operation 1108, a point-in-time image (e.g., a point-in-time image 108 of FIG. 1) of the logical volume (e.g., the logical volume 106, 504 of FIGS. 1-2, 5) may be generated.

In operation 1110, a first table may be created to track modifications to the logical volume (e.g., the logical volume 106, 504 of FIGS. 1-2, 5), associating the first table with the logical volume (e.g., the logical volume 106, 504 of FIGS. 1-2, 5) and incorporating the first table into a structure (e.g., the structure 100 of FIG. 1, 2). In operation 1112, a second table may be created to track modifications to the point-in-time image (e.g., a point-in-time image 108 of FIG. 1), associating the second table with the point-in-time image (e.g., a point-in-time image 108 of FIG. 1), and incorporating the second table into the structure (e.g., the structure 100 of FIG. 1, 2).

Figure 11B:
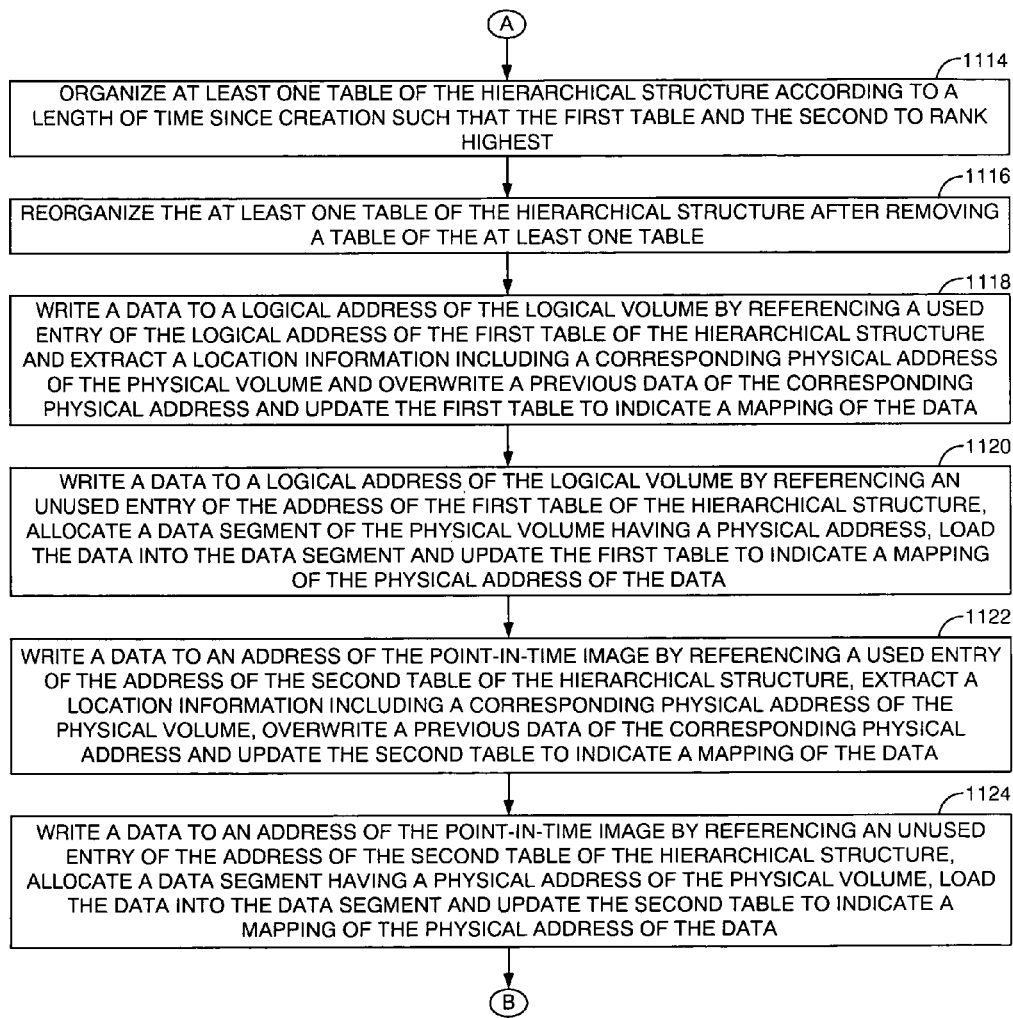
FIG. 11B is a continuation of process flow of FIG. 11A illustrating additional processes, according to one embodiment.

FIG. 11B is a continuation of process flow of FIG. 11A illustrating additional processes, according to one embodiment. In operation 1114, the table of the hierarchical structure (e.g., the hierarchical structure module 116 of FIG. 1) may be organized according to a length of time since creation such that the first table and the second table to rank highest. In operation 1116, the table of the hierarchical structure (e.g., the hierarchical structure module 116 of FIG. 1) may be reorganized after removing a table of the at least one table.

In operation 1118 a data may be written to a logical address (e.g., the logical address (index) field 404 of FIG. 4) of the logical volume (e.g., the logical volume 106, 504 of FIGS. 1-2, 5) by referencing a used entry of the logical address (e.g., the logical address (index) field 404 of FIG. 4) of the first table of the hierarchical structure (e.g., the hierarchical structure module 116 of FIG. 1), extracting a location information including a corresponding physical address (e.g., the physical address field 410 of FIG. 4) of the physical volume (e.g., the physical volume 104,520 of FIGS. 1-2, 5), overwriting a previous data of the corresponding physical address (e.g., the physical address field 410 of FIG. 4), and updating the first table to indicate a mapping of the data.

In operation 1120, the data may be written to a logical address (e.g., the logical address (index) field 404 of FIG. 4) of the logical volume (e.g., the logical volume 106, 504 of FIGS. 1-2, 5) by referencing an unused entry of the address of the first table of the hierarchical structure (e.g., the hierarchical structure module 116 of FIG. 1), allocating a data segment of the physical volume (e.g., the physical volume 104,520 of FIGS. 1-2, 5) having a physical address (e.g., the physical address field 410 of FIG. 4), loading the data into the data segment, and updating the first table to indicate the mapping of the physical address (e.g., the physical address field 410 of FIG. 4) of the data.

In operation 1122, the data may be written to an address of the point-in-time image (e.g., a point-in-time image 108 of FIG. 1) by referencing an used entry of the address of the second table of the hierarchical structure (e.g., the hierarchical structure module 116 of FIG. 1), extracting a location information including a corresponding physical address (e.g., the physical address field 410 of FIG. 4) of the physical volume (e.g., the physical volume 104,520 of FIGS. 1-2, 5), overwriting a previous data of the corresponding physical address (e.g., the physical address field 410 of FIG. 4), and updating the second table to indicate the mapping of the data.

In operation 1124, the data may be written to the address of the point-in-time image (e.g., a point-in-time image 108 of FIG. 1) by referencing the unused entry of the address of the second table of the hierarchical structure (e.g., the hierarchical structure module 116 of FIG. 1), allocating a data segment having the physical address (e.g., the physical address field 410 of FIG. 4) of the physical volume (e.g., the physical volume 104,520 of FIGS. 1-2, 5), loading the data into the data segment, and updating the second table to indicate the mapping of the physical address (e.g., the physical address field 410 of FIG. 4) of the data.

Figure 11C:
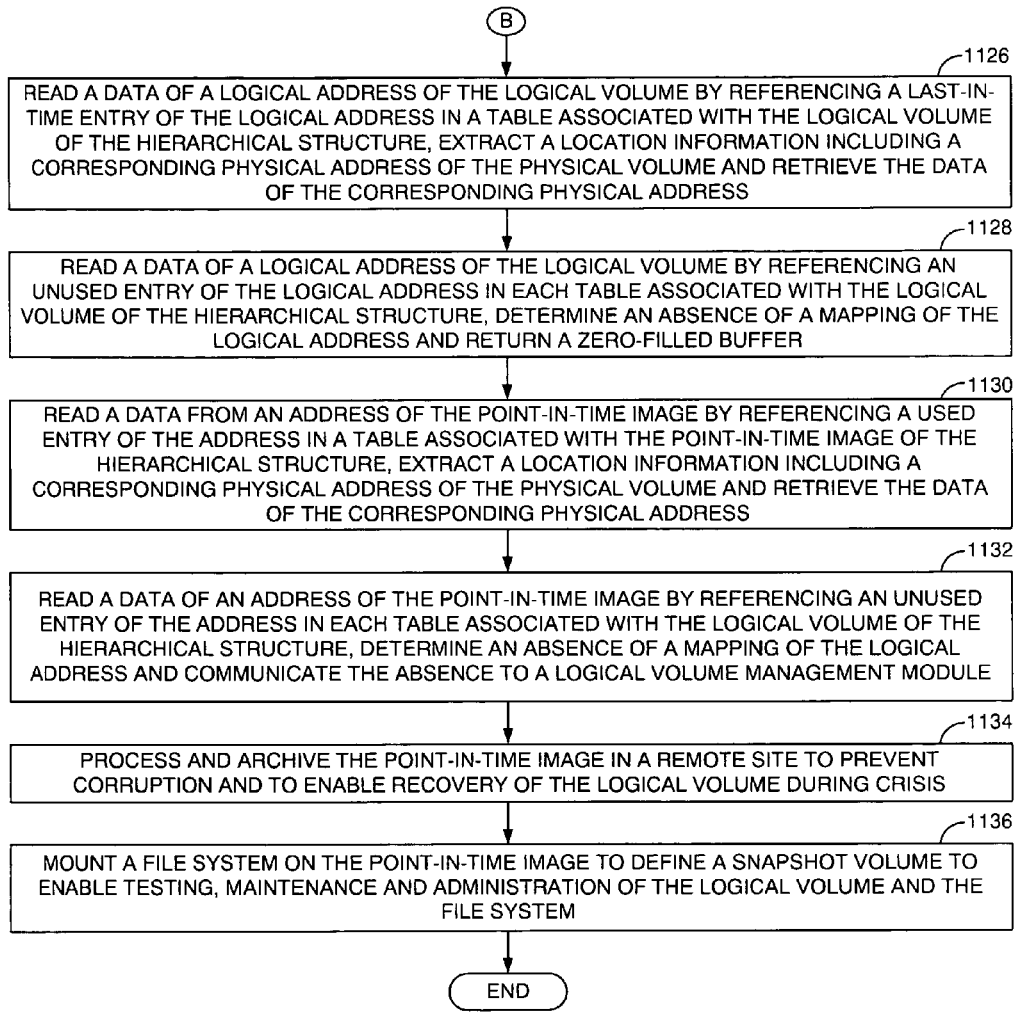
FIG. 11C is a continuation of process flow of FIG. 11B illustrating additional processes, according to one embodiment.

FIG. 11C is a continuation of process flow of FIG. 11B illustrating additional processes, according to one embodiment. In operation 1126, the data of the logical address (e.g., the logical address (index) field 404 of FIG. 4) of the logical volume (e.g., the logical volume 106, 504 of FIGS. 1-2, 5) may be read by referencing a last-in-time entry of the logical address (e.g., the logical address (index) field 404 of FIG. 4) in the table associated with the logical volume (e.g., the logical volume 106, 504 of FIGS. 1-2, 5) of the hierarchical structure (e.g., the hierarchical structure module 116 of FIG. 1), extracting the location information including the corresponding physical address (e.g., the physical address field 410 of FIG. 4) of the physical volume (e.g., the physical volume 104,520 of FIGS. 1-2, 5), and retrieving the data of the corresponding physical address (e.g., the physical address field 410 of FIG. 4).

In operation 1128, the data of the logical address (e.g., the logical address (index) field 404 of FIG. 4) of the logical volume (e.g., the logical volume 106, 504 of FIGS. 1-2, 5) may be read by referencing the unused entry of the logical address (e.g., the logical address (index) field 404 of FIG. 4) in each table associated with the logical volume (e.g., the logical volume 106, 504 of FIGS. 1-2, 5) of the hierarchical structure (e.g., the hierarchical structure module 116 of FIG. 1), determining an absence of the mapping of the logical address (e.g., the logical address (index) field 404 of FIG. 4), and returning a zero-filled buffer.

In operation 1130, the data may be read from the address of the point-in-time image (e.g., a point-in-time image 108 of FIG. 1) by referencing the last-in-time entry of the address in the table associated with the point-in-time image (e.g., a point-in-time image 108 of FIG. 1) of the hierarchical structure, extracting the location information including the corresponding physical address (e.g., the physical address field 410 of FIG. 4) of the physical volume (e.g., the physical volume 104,520 of FIGS. 1-2, 5), and retrieving the data of the corresponding physical address.

In operation 1132, the data of the address of the point-in-time image (e.g., a point-in-time image 108 of FIG. 1) may be read by referencing the unused entry of the address in each table associated with the logical volume (e.g., the logical volume 106, 504 of FIGS. 1-2, 5) of the hierarchical structure (e.g., the hierarchical structure module 116 of FIG. 1), determining the absence of the mapping of the logical address (e.g., the logical address (index) field 404 of FIG. 4), and communicating the absence to a logical volume management module (e.g., logical volume management module 110 of FIG. 1).

In operation 1134, the point-in-time image may be processed and archived in a remote site to prevent corruption and to enable recovery of the logical volume (e.g., the logical volume 106 of FIGS. 1-2, the logical volume 504 of FIG. 5) during a crisis. In operation 1136, a file system may be mounted on the point-in-time image (e.g., a point-in-time image 108 of FIG. 1) to define a snapshot volume to enable testing, maintenance, and administration of the logical volume (e.g., the logical volume 106 of FIG. 1, 2 and the logical volume 504 of FIG. 5) and the file system.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

Similarly, the modules disclosed herein may be enabled using software programming techniques. For example, the various electrical structure and methods may be embodied using transistors, logic gates, and electrical circuits (e.g., application specific integrated ASIC circuitry and/or in Digital Signal; Processor DSP circuitry). For example, the logical volume management module 110, the snapshot module 112, the mapping module 114, the hierarchical structure module 116, the read module 118, the write module 120, the remote replication module 142, the network communication module 202, the physical volume allocation module 204, the logical volume allocation module 206, the input/output channel module 208, and other modules of FIGS. 1-11 may be embodied through a logical volume management circuit 110, a snapshot circuit 112, a mapping circuit 114, a hierarchical structure circuit 116, a read circuit 118, a write circuit 120, a remote replication circuit 142, a network communication circuit 202, a physical volume allocation circuit 204, a logical volume allocation circuit 206, a input/output channel circuit, and other circuits using one or more of the technologies described herein.

In addition, it will be appreciated that the various operations, processes, and methods disclosed herein may be embodied in a machine-readable medium and/or a machine accessible medium compatable with a data processing system (e.g., a computer system), and may be performed in any order. Accordingly, the specification and drawings are to be regarded in an illustrative rather than a restrictive sense.

What is claimed is:

1. A system comprising:
   a physical volume;
   a structure including at least one table to provide a mapping to a location of a data segment of the physical volume, the at least one table indicating a set of updates of the physical volume during a time period;
   a logical volume management module to define a logical volume as an arrangement of the physical volume;
   a snapshot module to automatically generate a point-in-time image of the logical volume and to prompt the logical volume management module to create a first table and a second table and to insert the first table and the second table into the structure, the first table to provide a set of updates associated with at least one of a read operation and a write operation to the logical volume, the second table to provide a set of updates to the point-in-time image, and the structure thereby to provide a set of common mappings of the point-in-time image and the logical volume; and
   a hierarchical structure module:
      to organize tables within the structure hierarchically according to a length in time since creation, the tables including the at least one table, the first table, and the second table, wherein the first table and the second table rank highest, and to reorganize the tables structure hierarchically, based on a removal of at least one of the first table and the second table.

2. The system of claim 1, further comprising a remote replication module of a remote site to process and to archive the point-in-time image of the snapshot module to prevent damage to the data during a crisis of the physical volume to enable recovery of the physical volume.

3. The system of claim 2, further comprising a file system to provide a directory of files and to mount on at least one of the point-in-time image to define a snapshot volume and the logical volume, such that the snapshot volume to enable testing, maintenance and administration of the file system and the logical volume.

4. A method comprising:
- storing data of an enterprise in a physical volume;
- instantiating a logical volume to provide an arrangement of the data of the physical volume;
- providing a hierarchical structure to indicate mappings between an address of the data of the logical volume and an address of the data of the physical volume;
- generating a point-in-time image of the logical volume;
- creating a first table to track modifications to the logical volume, associating the first table with the logical volume, and incorporating the first table into the hierarchical structure;
- creating a second table to track modifications to the point-in-time image, associating the second table with the point-in-time image, and incorporating the second table into the hierarchical structure;
- organizing tables of the hierarchical structure according to a length of time since creation, such that the first table and the second table rank highest; and
- reorganizing the tables of the hierarchical structure according to a length of time since creation after a removal of at least one of the tables.

5. The method of claim 4, further comprising writing a data to a logical address of the logical volume by referencing a used entry of the logical address of the first table of the hierarchical structure, extracting a location information including a corresponding physical address of the physical volume, overwriting a previous data of the corresponding physical address, and updating the first table to indicate a mapping of the data.

6. The method of claim 5, further comprising writing the data to the logical address of the logical volume by referencing an unused entry of the address of the first table of the hierarchical structure, allocating a data segment of the physical volume having a physical address, loading the data into the data segment, and updating the first table to indicate the mapping of the physical address of the data.

7. The method of claim 6, further comprising writing the data to an address of the point-in-time image by referencing an used entry of the address of the second table of the hierarchical structure, extracting the location information including the corresponding physical address of the physical volume, overwriting a previous data of the corresponding physical address, and updating the second table to indicate the mapping of the data.

8. The method of claim 7, further comprising writing the data to the address of the point-in-time image by referencing the unused entry of the address of the second table of the hierarchical structure, allocating a data segment having the physical address of the physical volume, loading the data into the data segment, and updating the second table to indicate the mapping of the physical address of the data.

9. The method of claim 8, further comprising reading the data of the logical address of the logical volume by referencing a used entry of the logical address in the table associated with the logical volume of the hierarchical structure, extracting the location information including the corresponding physical address of the physical volume, and retrieving the data of the corresponding physical address.

10. The method of claim 9, further comprising reading the data of the logical address of the logical volume by referencing an unused entry of the logical address in each table associated with the logical volume of the hierarchical structure, determining an absence of the mapping of the logical address, and returning a zero-filled buffer.

11. The method of claim 10, further comprising reading the data from the address of the point-in-time image by referencing a used entry of the address in the table associated with the point-in-time image of the hierarchical structure, extracting the location information including the corresponding physical address of the physical volume, and retrieving the data of the corresponding physical address.

12. The method of claim 11, further comprising reading the data of the address of the point-in-time image by referencing the unused entry of the address in each table associated with the logical volume of the hierarchical structure, determining the absence of the mapping of the logical address, and communicating the absence to a logical volume management module.

13. The method of claim 12, further comprising processing and archiving the point-in-time image in a remote site to prevent corruption and to enable recovery of the logical volume during a crisis.

14. The method of claim 13, further comprising mounting a file system on the point-in-time image to define a snapshot volume to enable testing, maintenance, and administration of the logical volume and the file system.

15. A system comprising:
- a physical volume;
- a structure including at least one table to provide a mapping to a location of a data segment of the physical volume, wherein the at least one table indicates a set of updates of the physical volume during a time period;
- a logical volume management module to define a logical volume as an arrangement of the physical volume;
- a data processing system to perform a write Input/Output (TO) operation and a read IO operation;
- a snapshot module to automatically generate a point-in-time image of the logical volume, to prompt the logical volume management module to create a first table and a second table, and to insert the first table and the second table into the structure, the first table to provide a set of updates associated with at least one of the read operation and the write operation to the logical volume, and the second table to provide a set of updates to the point-in-time image, thereby the structure to provide a set of common mappings of the point-in-time image and the logical volume; and
- a hierarchical structure module to organize tables within the structure hierarchically according to a length in time since creation, the tables including the at least one table, the first table, and the second table, wherein the first table and the second table rank highest, and to reorganize the tables structure hierarchically, based on a removal of at least one of the first table and second table,
- wherein the data processing system is further configured to copy a used entry of an address of a lower ranked table associated with at least one of the logical volume and the point-in-time image to an unused entry of the address of a higher ranked table of the at least one of the logical volume and the point-in-time image.

16. The system of claim 15, further comprising a remote replication module of a remote site to process and to archive the point-in-time image of the snapshot module to prevent damage to the data during a crisis of the physical volume to enable recovery of the physical volume.

17. The system of claim 16, further comprising a file system to provide a directory of files and to mount on at least one of the point-in-time image to define a snapshot volume and the logical volume, such that the snapshot volume to enable testing, maintenance and administration of the file system and the logical volume.

18. A method comprising:
    storing data of an enterprise in a physical volume;
    instantiating a logical volume to provide an arrangement of the data of the physical volume;
    providing a hierarchical structure to indicate mappings between an address of the data of the logical volume and an address of the data of the physical volume;
    generating a point-in-time image of the logical volume;
    creating a first table to track modifications to the logical volume, associating the first table with the logical volume, and incorporating the first table into the hierarchical structure;
    creating a second table to track modifications to the point-in-time image;
    associating the second table with the point-in-time image, and incorporating the second table into the hierarchical structure;
    organizing tables of the hierarchical structure according to a length of time since creation such that the first table and the second table rank highest;
    copying a used entry of an address of a lower ranked table associated with at least one of the logical volume and the point-in-time image to an unused entry of the address of a higher ranked table of the at least one of the logical volume and the point-in-time image; and
    reorganizing the tables of the hierarchical structure according to a length of time since creation after a removal of at least one of the first table and the second table.

19. The method of claim 18, further comprising writing a data to a logical address of the logical volume by referencing a used entry of the logical address of the first table of the hierarchical structure, extracting a location information including a corresponding physical address of the physical volume, overwriting a previous data of the corresponding physical address, and updating the first table to indicate a mapping of the data.

20. The method of claim 19, further comprising writing the data to the logical address of the logical volume by referencing an unused entry of the address of the first table of the hierarchical structure, allocating a data segment of the physical volume having a physical address, loading the data into the data segment, and updating the first table to indicate the mapping of the physical address of the data.

21. The method of claim 20, further comprising writing the data to an address of the point-in-time image by referencing an used entry of the address of the second table of the hierarchical structure, extracting the location information including the corresponding physical address of the physical volume, overwriting a previous data of the corresponding physical address, and updating the second table to indicate the mapping of the data.

22. The method of claim 21, further comprising writing the data to the address of the point-in-time image by referencing the unused entry of the address of the second table of the hierarchical structure, allocating a data segment having the physical address of the physical volume, loading the data into the data segment, and updating the second table to indicate the mapping of the physical address of the data.

23. The method of claim 22, further comprising reading the data of the logical address of the logical volume by referencing an used entry of the logical address in the table associated with the logical volume of the hierarchical structure, extracting the location information including the corresponding physical address of the physical volume, and retrieving the data of the corresponding physical address.

24. The method of claim 23, further comprising reading the data of the logical address of the logical volume by referencing an unused entry of the logical address in each table associated with the logical volume of the hierarchical structure, determining an absence of the mapping of the logical address, and returning a zero-filled buffer.

25. The method of claim 24, further comprising reading the data from the address of the point-in-time image by referencing an used entry of the address in the table associated with the point-in-time image of the hierarchical structure, extracting the location information including the corresponding physical address of the physical volume, and retrieving the data of the corresponding physical address.

26. The method of claim 5, further comprising reading the data of the address of the point-in-time image by referencing the unused entry of the address in each table associated with the logical volume of the hierarchical structure, determining the absence of the mapping of the logical address, and communicating the absence to a logical volume management module.

27. The method of claim 26, further comprising processing and archiving the point-in-time image in a remote site to prevent corruption and to enable recovery of the logical volume during a crisis.

28. The method of claim 27, further comprising mounting a file system on the point-in-time image to define a snapshot volume to enable testing, maintenance, and administration of the logical volume and the file system.

* * * * *